United States Patent
Jung et al.

(10) Patent No.: US 12,175,946 B2
(45) Date of Patent: Dec. 24, 2024

(54) FOLDABLE DISPLAY FOR REDUCING POWER CONSUMPTION AND DRIVING METHOD THEREOF

(71) Applicant: LG Display Co., Ltd., Seoul (KR)

(72) Inventors: Heain Jung, Paju-si (KR); Myungkook Moon, Paju-si (KR); Haejong Jang, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/600,424

(22) Filed: Oct. 11, 2019

(65) Prior Publication Data

US 2020/0152109 A1 May 14, 2020

(30) Foreign Application Priority Data

Nov. 14, 2018 (KR) .................. 10-2018-0139992

(51) Int. Cl.
| | |
|---|---|
| *G09G 3/36* | (2006.01) |
| *G06F 3/147* | (2006.01) |
| *G09G 3/00* | (2006.01) |
| *G09G 3/20* | (2006.01) |

(52) U.S. Cl.
CPC .......... *G09G 3/3648* (2013.01); *G06F 3/147* (2013.01); *G09G 3/035* (2020.08); *G09G 3/20* (2013.01); *G09G 2310/08* (2013.01); *G09G 2330/021* (2013.01)

(58) Field of Classification Search
CPC ........................................ G09G 3/20
See application file for complete search history.

(56) References Cited

U.S. PATENT DOCUMENTS

| | | | |
|---|---|---|---|
| 2007/0296617 A1* | 12/2007 | Murata | G06F 5/06 341/101 |
| 2010/0064244 A1* | 3/2010 | Kilpatrick, II | G06F 1/1649 715/773 |
| 2010/0079355 A1* | 4/2010 | Kilpatrick, II | G06F 3/0487 345/1.3 |
| 2011/0216064 A1* | 9/2011 | Dahl | G06F 1/1677 345/428 |
| 2013/0050270 A1* | 2/2013 | Joo | G09G 5/373 345/661 |
| 2013/0222323 A1* | 8/2013 | McKenzie | G06F 1/169 345/174 |
| 2013/0321340 A1* | 12/2013 | Seo | H04M 1/0214 345/174 |

(Continued)

FOREIGN PATENT DOCUMENTS

| | | |
|---|---|---|
| KR | 2001-0006164 | 1/2001 |
| KR | 10-2016-0082722 A | 7/2016 |

OTHER PUBLICATIONS

Chinese Office Action dated Sep. 28, 2023 issued in Patent Application No. 201910983272.0 w/English Translation (20 pages).

*Primary Examiner* — William Boddie
*Assistant Examiner* — Andrew B Schnirel
(74) *Attorney, Agent, or Firm* — POLSINELLI PC

(57) ABSTRACT

A foldable display device comprises a foldable display panel configured to display an image; a data driver configured to drive the foldable display panel; and a timing controller configured to control the data driver, wherein the timing controller blocks transmission of a data signal to be supplied to the data driver based on an analysis of a data signal input from outside.

21 Claims, 19 Drawing Sheets

(56) References Cited

U.S. PATENT DOCUMENTS

| | | | |
|---|---|---|---|
| 2015/0026623 A1* | 1/2015 | Horne | G06F 3/04883 |
| | | | 715/771 |
| 2015/0049428 A1 | 2/2015 | Lee et al. | |
| 2015/0310824 A1* | 10/2015 | Yang | G09G 5/006 |
| | | | 345/213 |
| 2016/0313846 A1* | 10/2016 | Hong | G06F 3/0412 |
| 2016/0321969 A1* | 11/2016 | Kambhatla | G09G 5/14 |
| 2018/0059721 A1* | 3/2018 | Akimoto | G06F 1/1618 |
| 2020/0019482 A1* | 1/2020 | Moon | G06F 11/3051 |

\* cited by examiner

Fig. 5
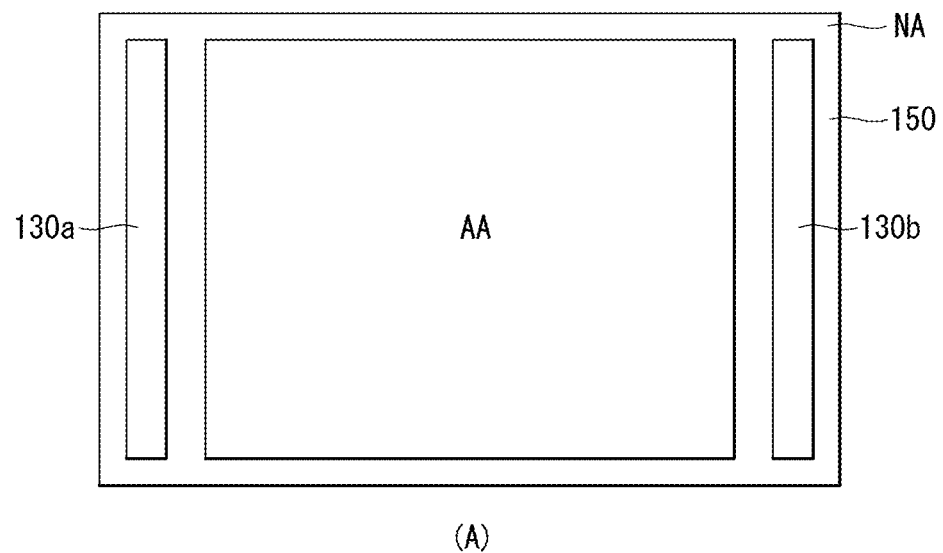
(A)
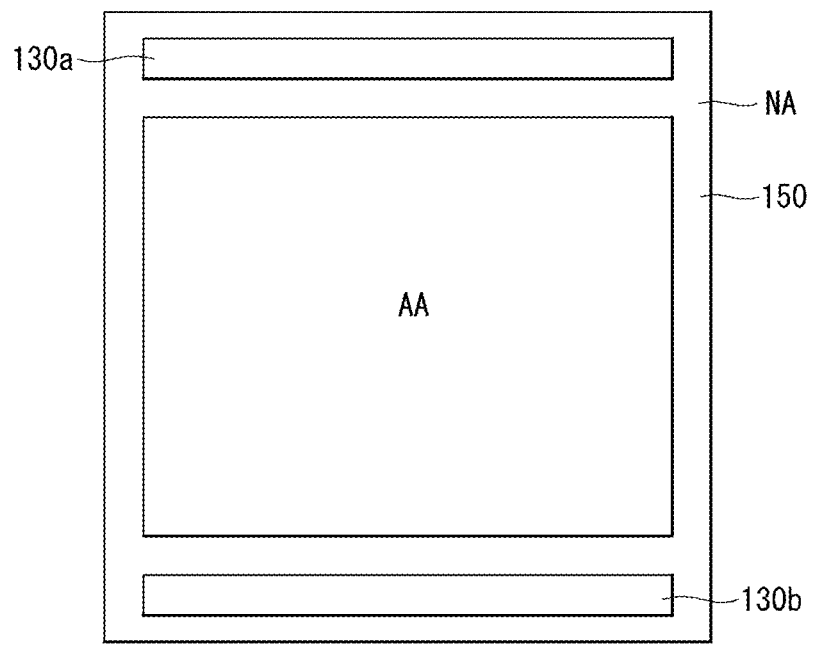
(B)

Fig. 6
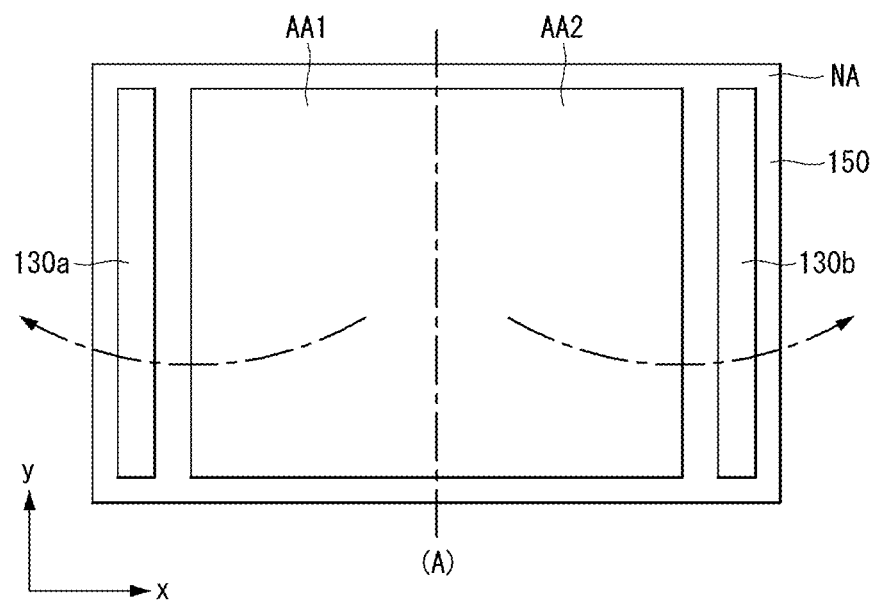
(A)
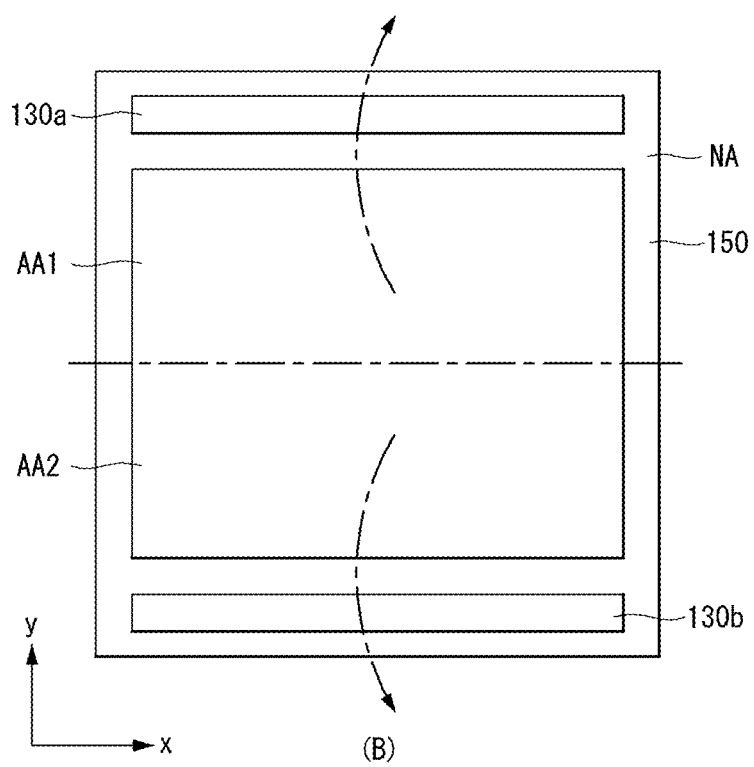
(B)

Fig. 19
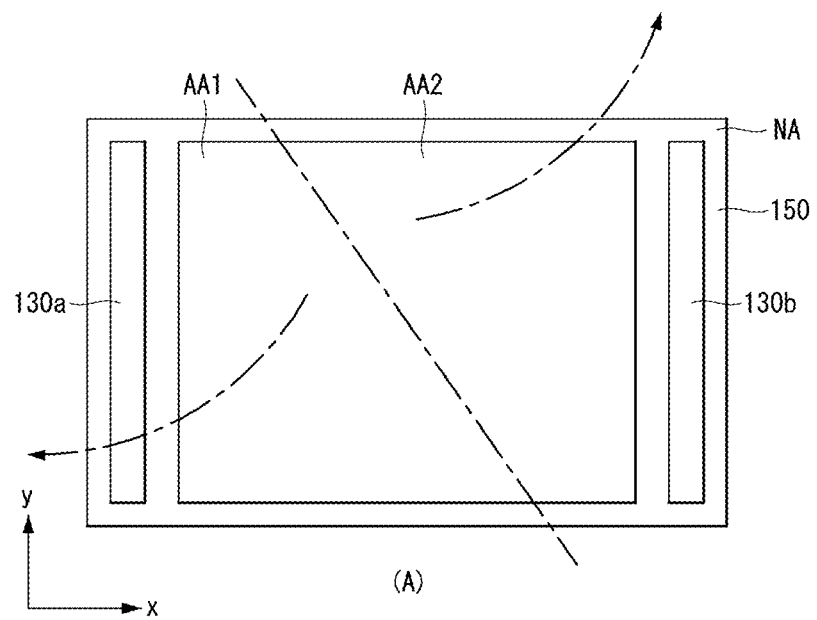
(A)
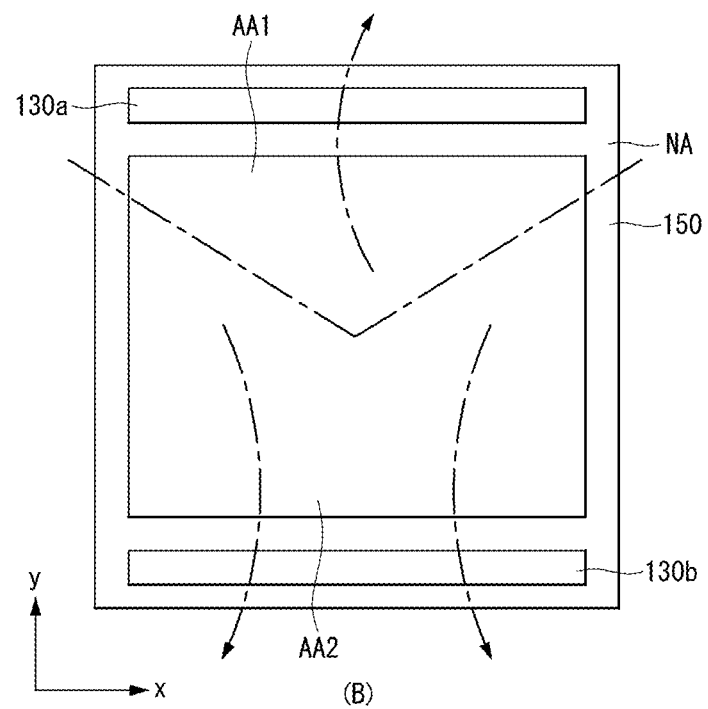
(B)

FOLDABLE DISPLAY FOR REDUCING POWER CONSUMPTION AND DRIVING METHOD THEREOF

CROSS REFERENCE TO RELATED APPLICATION

This application claims the benefit of Korean Patent Application No. 10-2018-0139992 filed on Nov. 14, 2018, which is hereby incorporated by reference in its entirety.

BACKGROUND

Field of the Disclosure

The present disclosure relates to a foldable display and a driving method thereof.

Description of the Background

With the development of information technology, the market of display devices, connection mediums between users and information, has grown. Accordingly, the use of display devices such as light emitting displays (LED), quantum dot displays (QDD), and liquid crystal displays (LCD) is on the increase.

The display devices may include a display panel including subpixels, a driver for outputting a driving signal for driving the display panel, and a power supply unit for generating power to be supplied to the display panel or the driver.

When the driving signal, e.g., a scan signal, a data signal, or the like, is supplied to the subpixels formed on the display panel, the selected subpixels allow light to be transmitted therethrough or emit light directly to display an image.

Some of the display devices have electrical and optical characteristics, such as a high response speed, high brightness, and a wide viewing angle, and mechanical advantages such as bending or unfolding the display panel as they are implemented to be flexible. Thus, a method of reducing power consumption of the display device having such mechanical advantages is required.

SUMMARY

In an aspect, a foldable display device including a foldable display panel, a data driver, and a timing controller is provided. The foldable display panel displays an image. The data driver drives the foldable display panel. The timing controller controls the data driver and blocks transmission of a data signal to be supplied to the data driver on the basis of an analysis of the data signal input from the outside.

In another aspect, a method of driving a foldable display device is provided. The method of driving a foldable display device includes analyzing an input data signal; analyzing whether a fixed data signal is present in the input data signal and determining a location of a display area for displaying an image and a location of a folded area not displaying an image on the foldable display panel; and blocking-transmission of a data signal to be supplied to the folded area.

BRIEF DESCRIPTION OF THE DRAWINGS

The accompany drawings, which are included to provide a further understanding of the disclosure and are incorporated on and constitute a part of this specification illustrate aspects of the disclosure and together with the description serve to explain the principles of the disclosure.

In the drawings:

FIG. 5 is an exemplary view of a display panel having a gate-in-panel type scan driver;

FIG. 6 is an exemplary view illustrating mechanical advantages when the display panel of FIG. 5 is implemented as a foldable display device;

FIG. 19 is an exemplary view illustrating a folded foldable display panel according to a third aspect of the present disclosure;

DETAILED DESCRIPTION

Hereinafter, specific aspects of the present disclosure will be described with reference to the accompanying drawings.

With the development of information technology, the market of display devices, connection mediums between users and information, has grown. Accordingly, the use of display devices such as light emitting displays (LED), quantum dot displays (QDD), and liquid crystal displays (LCD) is on the increase.

Some of the display devices are implemented as foldable display devices having electrical and optical characteristics, such as a high response speed, high brightness, and a wide viewing angle and mechanical advantages such as bending or unfolding the display panel as they are implemented to be flexible.

Figure 1:
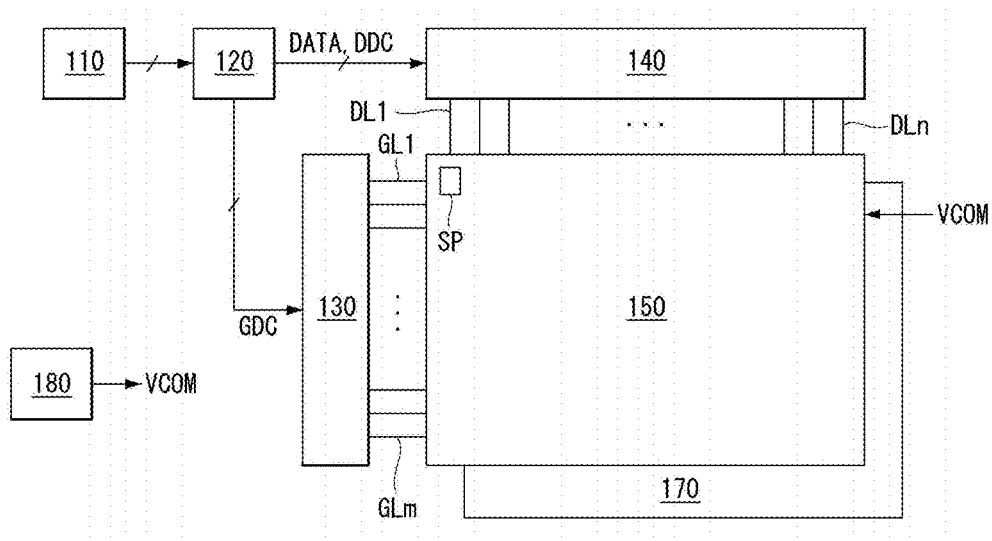
FIG. 1 is a block diagram schematically illustrating a liquid crystal display device.
Figure 2:
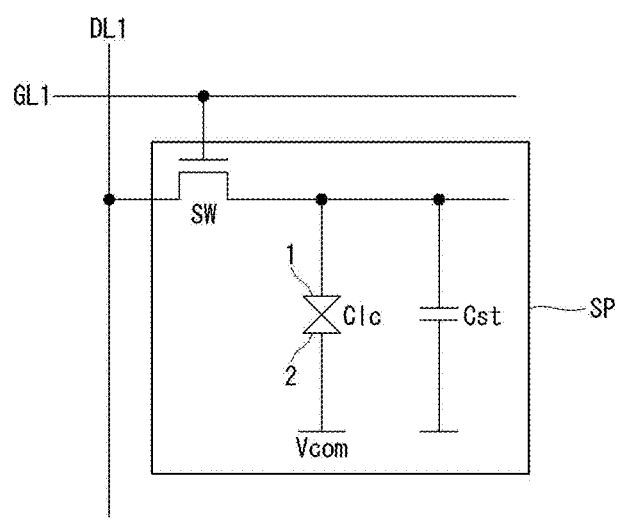
FIG. 2 is a circuit diagram schematically illustrating a subpixel of FIG. 1.

FIG. 1 is a block diagram schematically illustrating a liquid crystal display (LCD) device, and FIG. 2 is a circuit diagram schematically illustrating a subpixel of FIG. 1.

As illustrated in FIGS. 1 and 2, an LCD device includes an image supply unit 110, a timing controller 120, a scan driver 130, a data driver 140, a display panel 150, a backlight unit 170, a power supply unit 180, and the like.

The image supply unit 110 outputs various driving signals in addition to an image data signal supplied from the outside or an image data signal stored in an internal memory. The image supply unit 110 supplies a data signal and various driving signals to the timing controller 120.

The timing controller 120 outputs a gate timing control signal GDC for controlling an operation timing of the scan driver 130, a data timing control signal DDC for controlling an operation timing of the data driver 140, and various synchronization signals (Vsync as a vertical synchronization signal, Hsync as a horizontal synchronization signal, DE as a data output signal), and the like. The timing controller 120 supplies, to the data driver 140, together with the data timing control signal DDC, a data signal DATA supplied from the image supply unit 110. The timing controller 120 may be formed as an integrated circuit (IC) and mounted on a printed circuit board (PCB) but is not limited thereto.

The scan driver 130 outputs a scan signal (or a gate signal) in response to the gate timing control signal GDC supplied from the timing controller 120. The scan driver 130 supplies the scan signal to the subpixels included in the display panel 150 through scan lines GL1 to GLm. The scan driver 130 may be formed as an IC or may be formed directly on the display panel 150 in a gate-in-panel manner, but is not limited thereto.

In response to the data timing control signal DDC supplied from the timing controller 120, the data driver 140 samples and latches the data signal DATA and converts the data signal into an analog data voltage corresponding to a gamma reference voltage to output the same. The data driver 140 supplies the data voltage to the subpixels included in the display panel 150 through the data lines DL1 to DLn. The data driver 140 may be formed as an IC and mounted on the display panel 150 or mounted on a PCB, but is not limited thereto.

The power supply unit 180 generates and outputs a common voltage VCOM on the basis of an external input voltage supplied from the outside. The power supply unit 180 may generate and output a voltage (e.g., scan high voltage or scan low voltage) required for driving the scan driver 130 or a voltage (drain voltage or half drain voltage) required for driving the data driver 140, etc., as well as a common voltage VCOM.

The display panel 150 displays an image in response to the scan signal supplied from the scan driver 130, the data voltage supplied from the data driver 140, and the common voltage VCOM supplied from the power supply unit 180. The subpixels of the display panel 150 control light provided through a backlight unit 170.

For example, one subpixel SP includes a switching transistor SW, a storage capacitor Cst, and a liquid crystal layer Clc. A gate electrode of the switching transistor SW is connected to the scan line GL1 and a source electrode thereof is connected to the data line DLl One end of the storage capacitor Cst is connected to a drain electrode of the switching transistor SW and the other end thereof is connected to a common voltage line Vcom. The liquid crystal layer Clc is formed between a pixel electrode 1 connected to the drain electrode of the switching transistor SW and a common electrode 2 connected to the common voltage line Vcom.

The display panel 150 is implemented as a twisted nematic (TN) mode, a vertical alignment (VA) mode, an in-plane switching (IPS) mode, a fringe field switching (FFS) mode or an electrically controlled birefringence (ECB) mode depending on a structure of the pixel electrode 1 and the common electrode 2.

The backlight unit 170 provides light to the display panel 150 using a light source or the like that emits light. The backlight unit 170 includes a light emitting diode (LED), an LED driver for driving the LED, an LED board on which the LED is mounted, a light guide plate for converting light exiting from the LED into a surface light source, a reflector reflecting light from a lower portion of the light guide plate, optical sheets for collecting and spreading light exiting from the light guide plate, but are not limited thereto.

Figure 3:
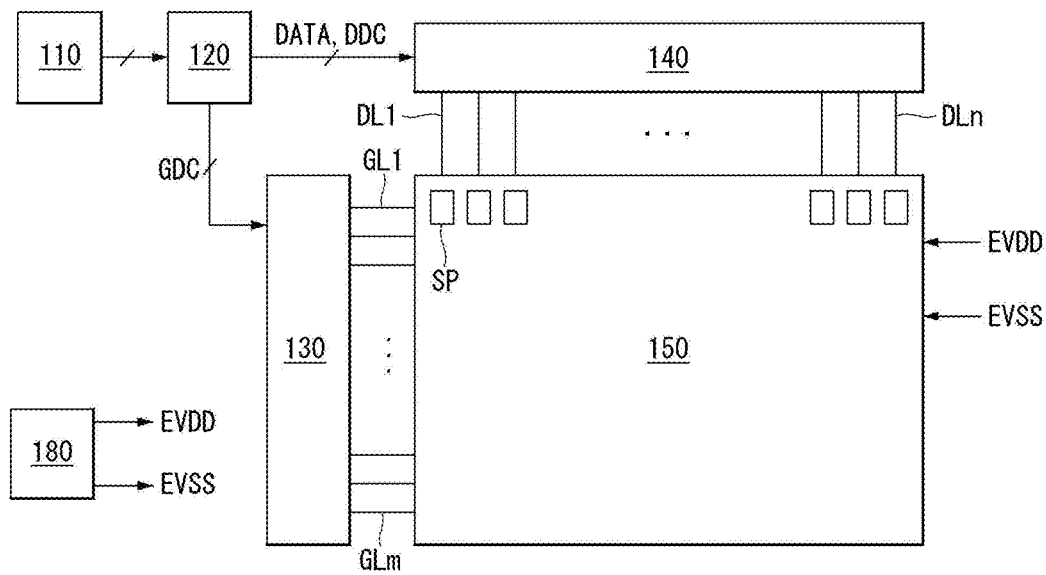
FIG. 3 is a block diagram schematically illustrating a light emitting display device.
Figure 4:
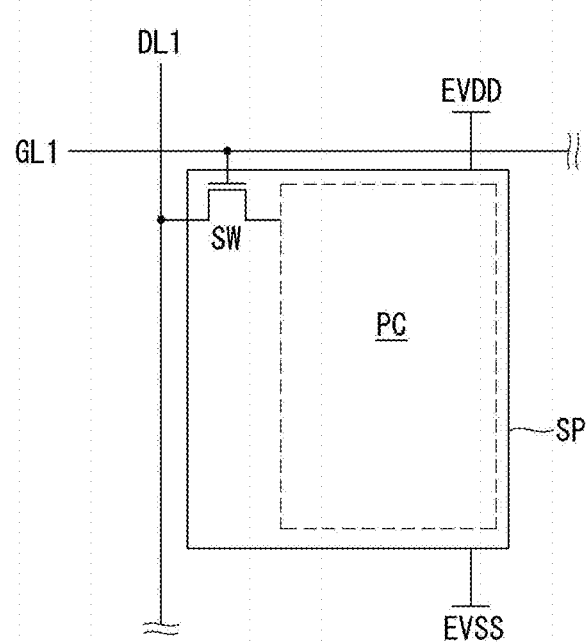
FIG. 4 is a view schematically illustrating a subpixel of FIG. 3.

FIG. 3 is a block diagram schematically illustrating a light emitting display device, and FIG. 4 is a schematic diagram illustrating a subpixel of FIG. 3.

As illustrated in FIGS. 3 and 4, the light emitting display includes an image supply unit 110, a timing controller 120, a scan driver 130, a data driver 140, a display panel 150, a power supply unit 180, and the like.

The image supply unit 110, the timing controller 120, the scan driver 130, the data driver 140, and the like, included in the light emitting display device are similar in basic structure and operation to the liquid crystal display of FIG. 1, and thus, a detailed description thereof will be omitted. The power supply unit 180 and the display panel 150, which are significantly distinguished from the liquid crystal display, will be described in detail.

The power supply unit 180 generates and outputs a first power EVDD having a high potential and a second power EVSS having a low potential on the basis of an external input voltage supplied from the outside. The power supply unit 180 may generate and output a voltage (e.g., scan high voltage or scan low voltage) required for driving the scan driver 130 or a voltage (drain voltage or half-drain voltage) required for driving the data driver 140, as well as the first and second powers EVDD and EVSS.

The display panel 150 displays an image in response to a scan signal output from a driver including the scan driver 130 and the data driver 140, a driving signal including a data voltage, and the first and second powers EVDD and EVSS output from the power supply unit 180. The subpixels of the display panel 150 emit light directly.

For example, one subpixel SP includes a pixel circuit PC including a switching transistor SW and a driving transistor, a storage capacitor, and a light emitting diode (LED). The subpixel SP used in the light emitting display device, which directly emits light, is complex in circuit configuration compared to a liquid crystal display device. In addition, a compensation circuit for compensating for deterioration of a driving transistor that supplies a driving current to the light emitting diode, as well as the light emitting diode that emits light, and the like, are complicated and vary. Thus, it is noted that the pixel circuit PC included in the subpixel SP is illustrated in a block form. Meanwhile, the light emitting diode may be on the basis of an organic light emitting diode or an inorganic light emitting diode.

FIG. 5 is an exemplary view of a display panel having a gate-in-panel type scan driver, and FIG. 6 is an exemplary view illustrating a mechanical advantage when the display panel of FIG. 5 is realized as a foldable display device.

As illustrated in FIG. 5, a display panel 150 having a gate-in panel type scan driver includes shift registers 130a and 130b disposed in a non-display area NA. The shift registers 130a and 130b output a scan signal and the like generated under the control of the timing controller to the display panel 150. The shift registers 130a and 130b may be arranged in left and right non-display areas NA of the display panel 150 (FIG. 5A) or in upper and lower non-display areas NA of the display panel 150 (FIG. 5B).

As illustrated in FIG. 6, the display panel 150 having the gate-in-panel type scan driver may be implemented as a foldable display device capable of folding a screen in a vertical direction (y) or in a horizontal direction (x). Since the display panel 150 (hereinafter, referred to as a 'foldable display panel') is implemented on the basis of the flexible substrate, the foldable display device may be mechanically deformable, and this is also possible with a display panel having an IC type scan driver.

Figure 7:
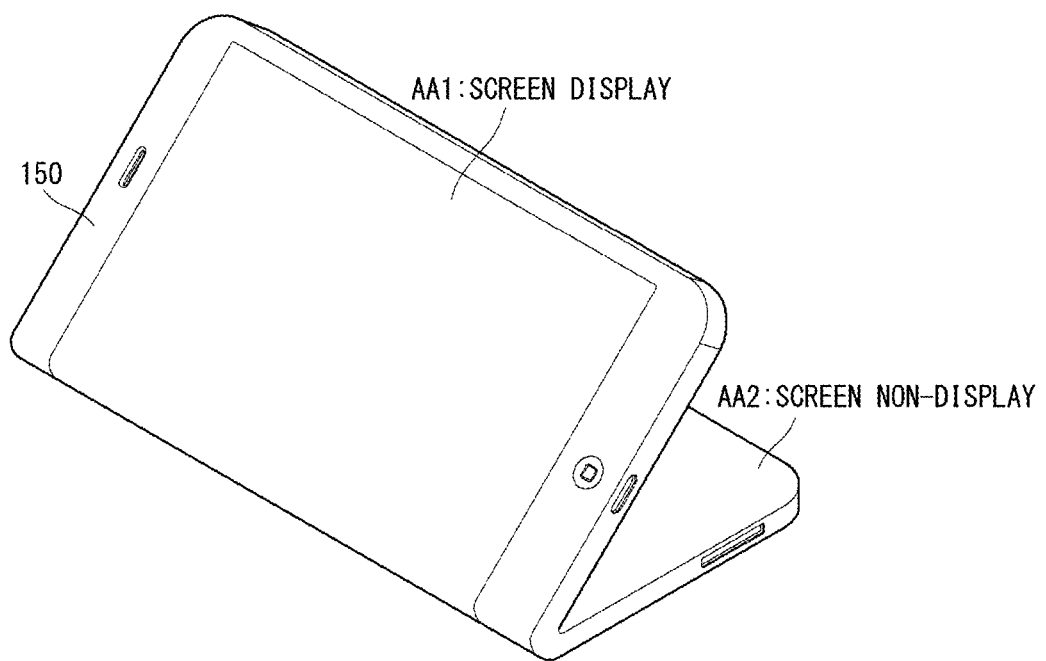
FIG. 7 is an exemplary view illustrating a folded foldable display panel according to a first aspect of the present disclosure.
Figure 8:
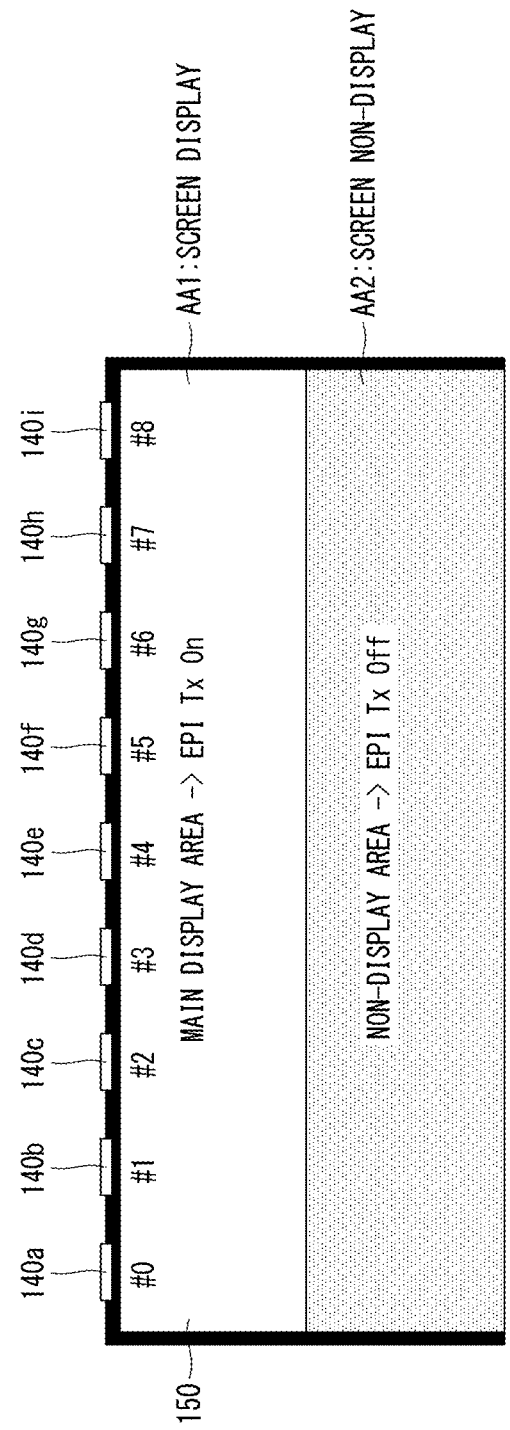
FIG. 8 is a view illustrating a change in output of a driver in accordance with a mechanical change of a foldable display panel according to a first aspect of the present disclosure.
Figure 9:
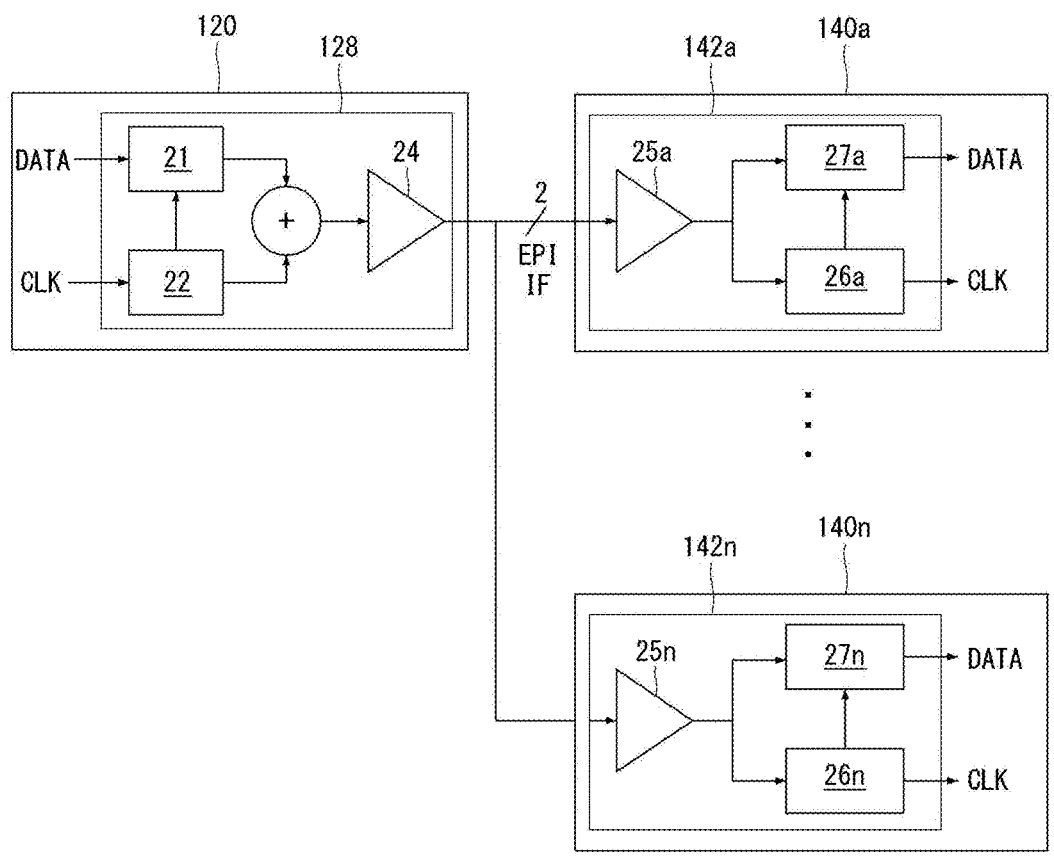
FIG. 9 is a view illustrating a data transmission/reception method between a timing controller and data drivers according to the first aspect of the present disclosure.
Figure 10:
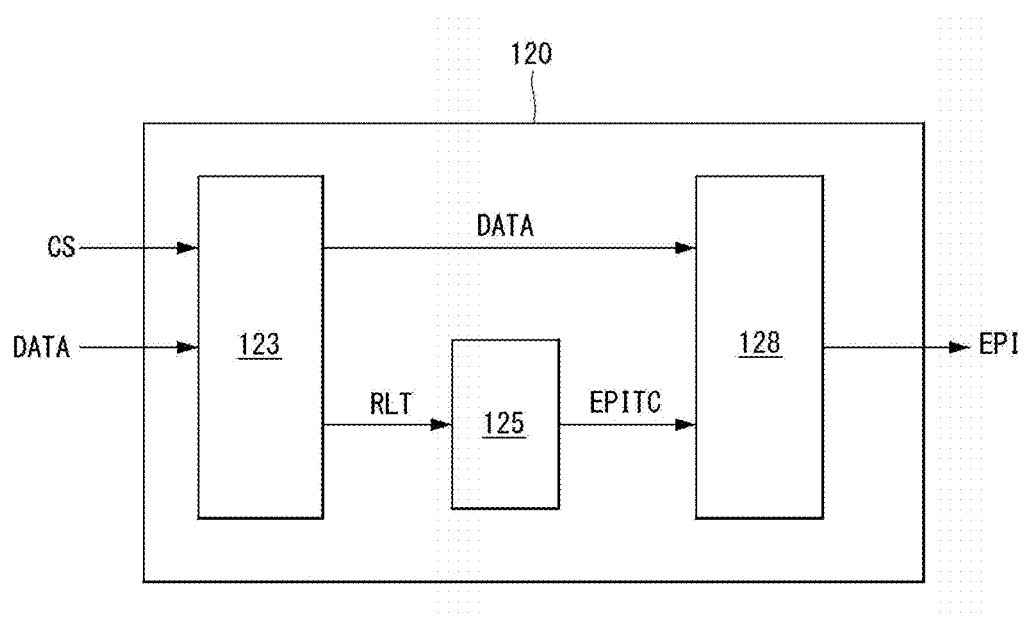
FIG. 10 illustrates an internal block of a timing controller according to the first aspect of the present disclosure.
Figure 11:
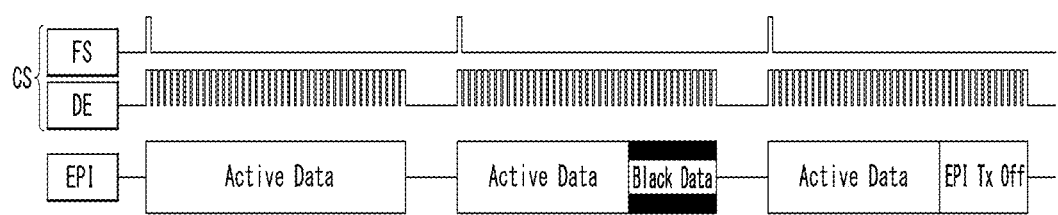
FIGS. 11 and 12 illustrate a change in output of a timing controller according to the first aspect of the present disclosure.
Figure 12:
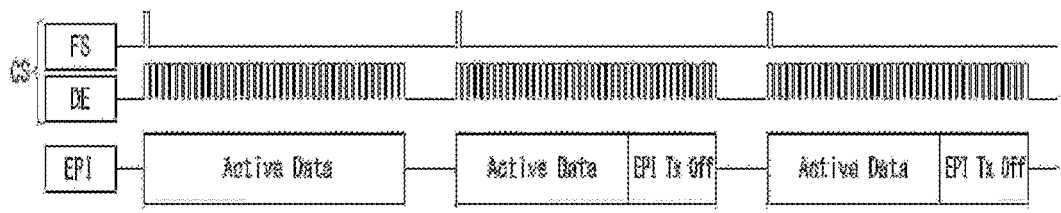
Figure 13:
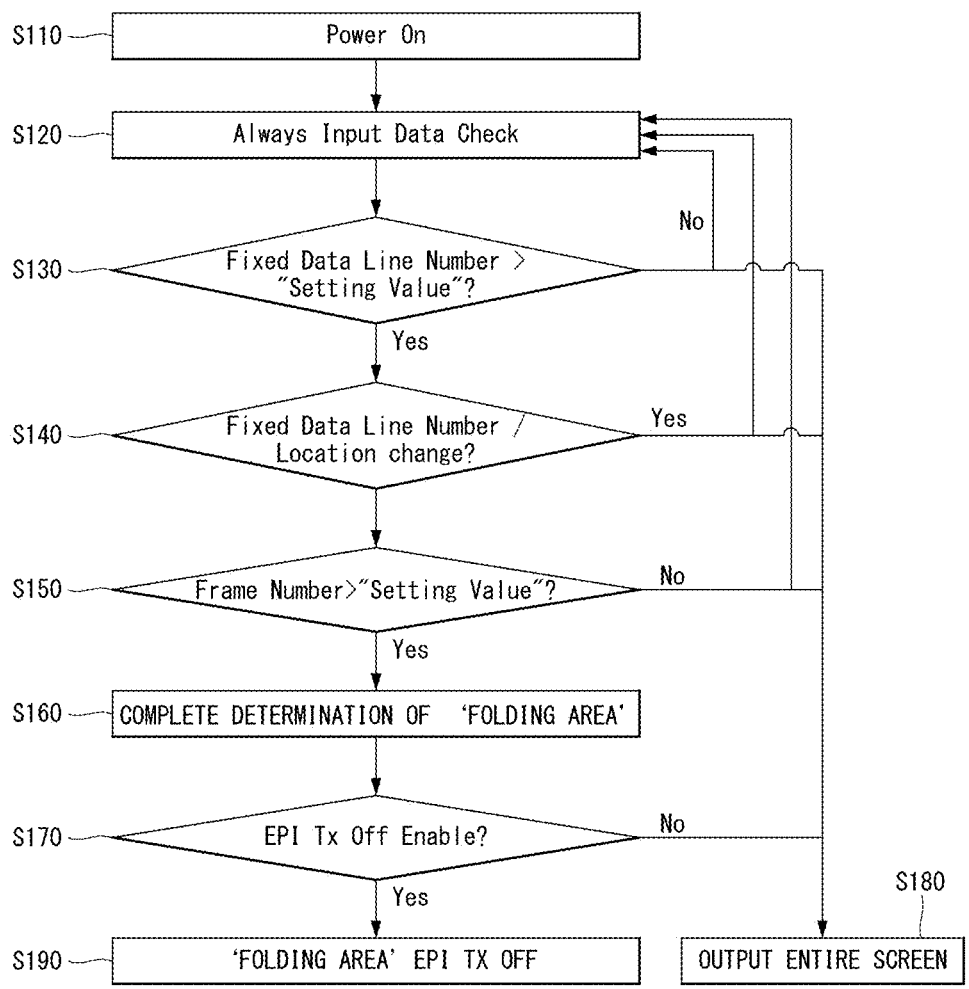
FIG. 13 is a flowchart illustrating a method of driving a display device according to the first aspect of the present disclosure.

FIG. 7 is an exemplary view illustrating a folded foldable display panel according to a first aspect of the present disclosure, FIG. 8 is a view illustrating a change in output of a driver in accordance with a mechanical change of a foldable display panel according to a first aspect of the present disclosure, FIG. 9 is a view illustrating a data transmission/reception method between a timing controller and data drivers according to the first aspect of the present disclosure. FIG. 10 illustrates an internal block of a timing controller according to the first aspect of the present disclosure, FIGS. 11 and 12 illustrate a change in output of a timing controller according to the first aspect of the present disclosure, and FIG. 13 is a flowchart illustrating a method of driving a display device according to the first aspect of the present disclosure.

As illustrated in FIG. 7, in the display panel 150 having a foldable screen, the display area AA may be divided into a first display area AA1 and a second display area AA2 according to whether it is a foldable portion or whether it is a portion viewed by the user.

In a first example, both the first display area AA1 and the second display area AA2 may be screens visible to the user. In this case, the first display area AA1 and the second display area AA2 may be implemented to display an image on the screen. Here, the first display area AA1 and the second display area AA2 may be one screen or may be divided into a main screen and a sub screen to display different images on the screen.

In a second example, the first display area AA1 may be visible to the user, while the second display area AA2 may be an invisible area that is not visible to the user. In this case, the first display area AA1 may display an image on the screen, but the second display area AA2 may not be displayed on the screen. Here, power consumption may be reduced by not using the second display area AA2. The drawing illustrated in FIG. 7 corresponds to the second example.

As illustrated in FIG. 8, according to the first aspect of the present disclosure, the foldable display panel 150 displays the first display area AA 1 on the basis of data voltages output from the data drivers 140a to 140i and does not display an image in second display area AA2. When the foldable display panel 150 is driven in this manner, the first aspect of the present disclosure controls (limits) output of the timing controller for controlling the data drivers 140a to 140i in order to reduce the power consumption of the device.

As illustrated in FIG. 9, a communication interface for data transmission/reception exists between the timing controller 120 and the data drivers 140a to 140i. The timing controller 120 includes a data transmitter 128 for transmitting a data signal DATA to the data drivers 140a to 140i. The data drivers 140a to 140i include data receivers 142a to 142n for receiving the data signal DATA transmitted from the timing controller 120, respectively.

The data transmitter 128 included in the timing controller 120 may include a data processing circuit 21, a clock generation circuit 22, an EPI transmission buffer 24, and the like. The timing controller 120 may rearrange the data signal DATA or the like according to an operation timing of the data drivers 140a to 140i on the basis of the data signal DATA supplied to the data processing circuit 21 and the clock signal CLK supplied to the clock generator circuit 22. In order to transmit the rearranged data signal DATA through the EPI interface EPI IF, the timing controller 120 may add the clock signal CLK between the data signals DATA to convert it into a differential signal pair. The timing controller 120 may transmit the converted differential signal pair to the data drivers 140a to 140i through the EPI transmission buffer 24.

The data receivers 142a to 142n included in the data drivers 140a to 140i may include EPI receiving buffers 25a to 25n, restoring circuits 26a to 26n, and sampling circuits 27a to 27n, respectively. The data drivers 140a to 140i may receive the differential signal pair transmitted from the timing controller 120 through the EPI receiving buffers 25a to 25n. The internal clock signal CLK is restored with the received differential signal pair by using the restoring circuits 26a to 26n and the data signals DATA may be sampled by the bits using the sampling circuits 27a to 27n, respectively.

In the first aspect, the EPI interface EPI IF is described as an example to describe a communication interface established between the timing controller 120 and the data drivers 140a to 140i. However, the present disclosure is not limited thereto and any other type communication interface may also be established.

As illustrated in FIG. 10, the timing controller 120 includes a data analyzer 123, a data transmission controller 125, and a data transmitter 128.

The data analyzer 123 receives the data signal DATA and a control signal CS from the outside. The data analyzer 123 always analyzes the input data signal DATA and outputs a result value RLT for determining the presence or absence of a folded area of the display panel. The data analyzer 123 analyzes the data signal on a line-by-line and frame-by-frame basis and determines positions of the display area and the folded area on the basis of whether there is a fixed data signal therein. For example, the data analyzer 123 may determine that a folded area exists if characteristics of the input data signal DATA are maintained at the same location and by the same number of lines for a predetermined period of time.

The data analyzer 123 may analyze the data signal input in at least one line unit and one frame unit, and if there is a fixed data signal for I (I is an integer of 1 or greater) line and J (J is an integer of 1 or greater) frame, the data analyzer 123 may define the corresponding location as a folded area, but the present disclosure is not limited thereto. The data analyzer 123 may analyze whether a signal is outputable to the portion determined as the folded area.

The data transmission controller 125 outputs a transmission control signal EPITC for interrupting (or blocking) a signal output of the area corresponding to the folded area on the display panel on the basis of the result value RLT output from the data analyzer 123. Since the data transmission controller 125 recognizes that an image is not to be displayed on the folded area of the display panel on the basis of the result value RLT, the data transmission controller 125 generates the transmission control signal EPITC for preventing unnecessary signal output to the area (to prevent power consumption).

The data transmitter 128 sets a signal output interval for outputting the externally input data signal DATA and a period for not outputting a signal (hereinafter, referred to as a "signal output interruption interval") on the basis of the transmission control signal EPITC output from the data transmission controller 125.

As illustrated in FIGS. 8 to 12, when the foldable display panel 150 is folded in half by the user, the first display area AA1 may become a main display area and the second display area AA2 may become a non-display area. In this case, the timing controller 120 outputs a signal for a portion for displaying an image, such as the first display area AA1 but interrupts signal output to a portion for not displaying an image, such as the second display area AA2.

The waveforms illustrated in FIGS. 11 and 12 are a data packet EPI and the control signals CS output from the timing controller 120. In the data packet EPI, and an effective data signal portion (Active Data) corresponds to data of the signal output interval to be applied to the first display area AA1 and a black data signal (Black Data) or an EPI transmission interruption portion (EPI Tx Off) corresponds to data of the signal output interruption interval (or signal output blocking interval). In the present disclosure, the case where the black data signal (Black Data) is written before the signal output interruption interval is written is taken as an example, but it may also be a gray data signal or a last data signal (or a previous data signal) output from the timing controller 120. The black data signal or the like may be defined as a buffer data signal since it is written to prevent a sudden change or abnormal display of an image. However, the writing of the buffer data signal such as the black data signal may be omitted.

The data drivers 140a to 140i receive the data packet EPI output from the timing controller 120, convert the effective data signal (Active Data) or the black data signal (Black Data) into a data voltage on the basis of the received data packet EPI, and supplies the converted data voltage to the foldable display panel 150. Meanwhile, since there is no effective data signal (Active Data) in the EPI transmission interruption portion (EPI Tx Off), the process of converting into a data voltage may be omitted. As a result, the data drivers 140a to 140i may include a channel for maintaining output of the data voltage, a channel for interrupting output of the data voltage, and a channel for outputting a buffer data voltage including a black data voltage. Here, an amplifier of the channel in which output of the data voltage is interrupted may be turned off.

Meanwhile, if a portion of the data lines controlled by at least one of the data drivers 140a to 140i is folded, the data driver 140 may include a channel for maintaining output of the data voltage, a channel for interrupting output of the data voltage, and a channel for outputting a buffer data voltage including a black data voltage.

In addition, the scan driver may also interrupt output of a scan signal in response to the portion where EPI transmission interruption (EPI Tx Off) is performed. Here, however, if the scan signal is interrupted, the folded portion of the display panel of the foldable display panel may not respond at a fast response speed. Also, it may be difficult to display a normal and stable image in the unfolded area. Therefore, in this sense, only output of the data signal output from the timing controller 120 may be interrupted.

In order to prevent a rapid change in the image during the signal output interruption interval, the timing controller 120 may perform EPI transmission interruption (EPI Tx Off) after applying a black data signal (Black Data) as illustrated in FIG. 11 or may perform EPI transmission interruption (EPI Tx Off) as illustrated in FIG. 12. Meanwhile, the case where the timing controller 120 outputs the data packet EPI on the basis of a frame start signal FS (or a vertical synchronization signal Vsync) indicating the start of a frame period and the control signal CS including the data output signal DE for activating the start of output of the data signal is taken as an example but the present disclosure is not limited thereto.

A method of driving the foldable display device according to the first aspect of the present disclosure will now be described with reference to FIGS. 8 to 13.

Power of a power source of the foldable display device is turned on (S110). An input data signal is always analyzed (Always Input Data Check) (S120). The analyzing of the input data signal may be performed by the timing controller 120.

It is analyzed whether the number of fixed data lines (or fixed data signals) deviates from a first set value set in the timing controller 120 (S130). When the number of the fixed data lines does not deviate from the first set value (NO), it means that there is no folded area in the data signal being currently analyzed. In this case, the timing controller 120 outputs a data signal for full-screen output without the signal output interruption interval (S180). However, if the number of fixed data lines deviates from the first set value (YES), it means that there is a folded area in the data signal currently being analyzed. The first set value set in the timing controller 120 may be a fixed value or a change value that may be changed by an external input.

It is analyzed whether the number or location of the fixed data lines is changed (Fixed Data Line Number/Location change?) (S140). If the number or location of fixed data lines is changed (YES), it means that there is no folded area in the data signal currently being analyzed. In this case, the timing controller 120 outputs a data signal for full-screen output without the signal output interruption interval (S180). If, however, the number or location of the fixed data lines is not changed (NO), it means that there may be a folded area in the data signal currently being analyzed.

It is analyzed whether the number of frames deviates from a second set value set in the timing controller 120 (Frame Number>"Setting Value"?) (S150). If the number of frames does not deviate from the second set value (NO), it means that there is no folded area in the data signal being currently analyzed. In this case, the timing controller 120 outputs a data signal for full-screen output without the signal output interruption interval (S180). If, however, the number of frames deviates from the second set value (YES), it means that there is a folded area in the currently analyzed data signal (means that a fixed data signal exists for several frames) (YES). The second set value set in the timing controller 120 may be a fixed value or a change value that may be changed by an external input.

If it is determined that the number of frames deviates from the second set value (YES), the timing controller 120 completes a final determination of the folded area ('Folded area' determination) (S160). In order to write the signal output interruption interval, it is determined whether EPI transmission interruption is enabled (EPI Tx Off Enable?) (S170). If the EPI transmission interruption is not enabled, the timing controller 120 outputs a data signal for full-screen output without the signal output interruption interval (S180). However, if the EPI transmission interruption is enabled, the timing controller 120 prepares a data packet to have the signal output interruption interval and performs EPI transmission interruption ('Folded area' EPI Tx Off) on the folded area (step S190).

The first aspect of the present disclosure has the effect that the input data signal may be always analyzed and the data transmission interruption interval may be prepared on the basis of a determination of the presence or absence of the folded area. In addition, the first aspect of the present disclosure has the effect that the timing controller may interrupt signal output even without a sensor for sensing folding of the foldable display panel and power consumption may be reduced on the basis of output interruption of the device. In addition, the first aspect of the present disclosure has the effect that the freedom degree of the foldable area (freedom degree of foldable method) and corresponding sensing capability may be increased because folding of the foldable display panel may be analyzed by itself without relying on a sensor.

Figure 14:
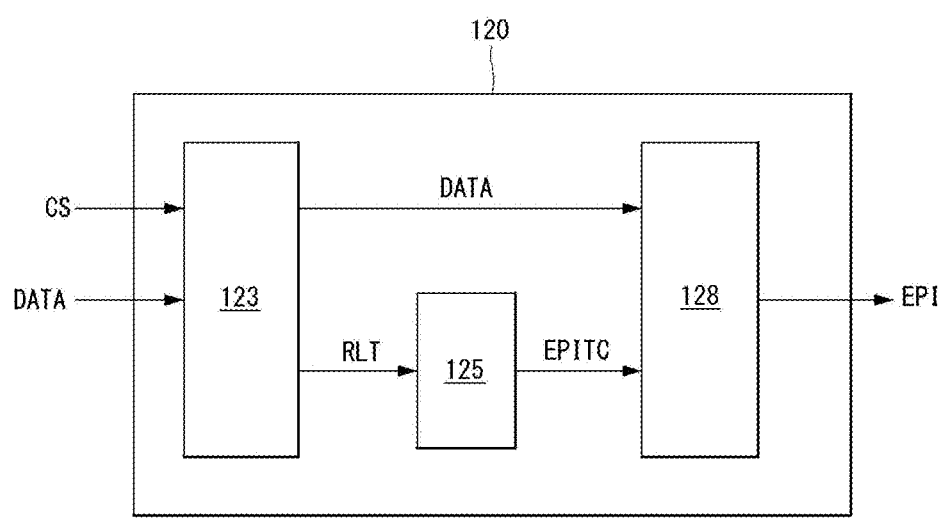
FIG. 14 illustrates an internal block of a timing controller according to a second aspect of the present disclosure.
Figure 15:
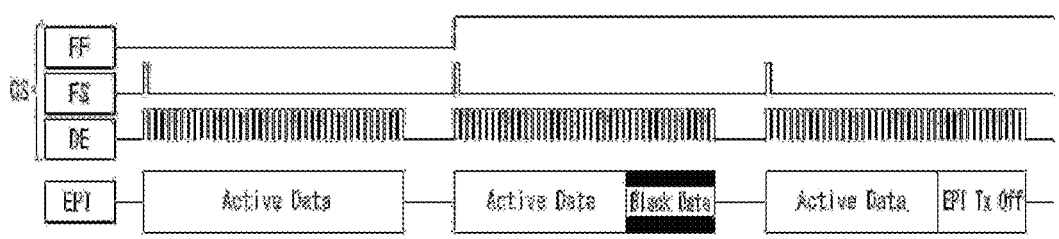
FIGS. 15 and 16 are views illustrating a change in output of a timing controller according to the second aspect of the present disclosure.
Figure 16:
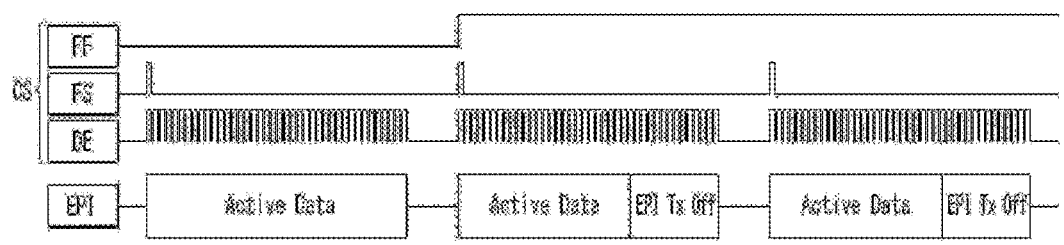
Figure 17:
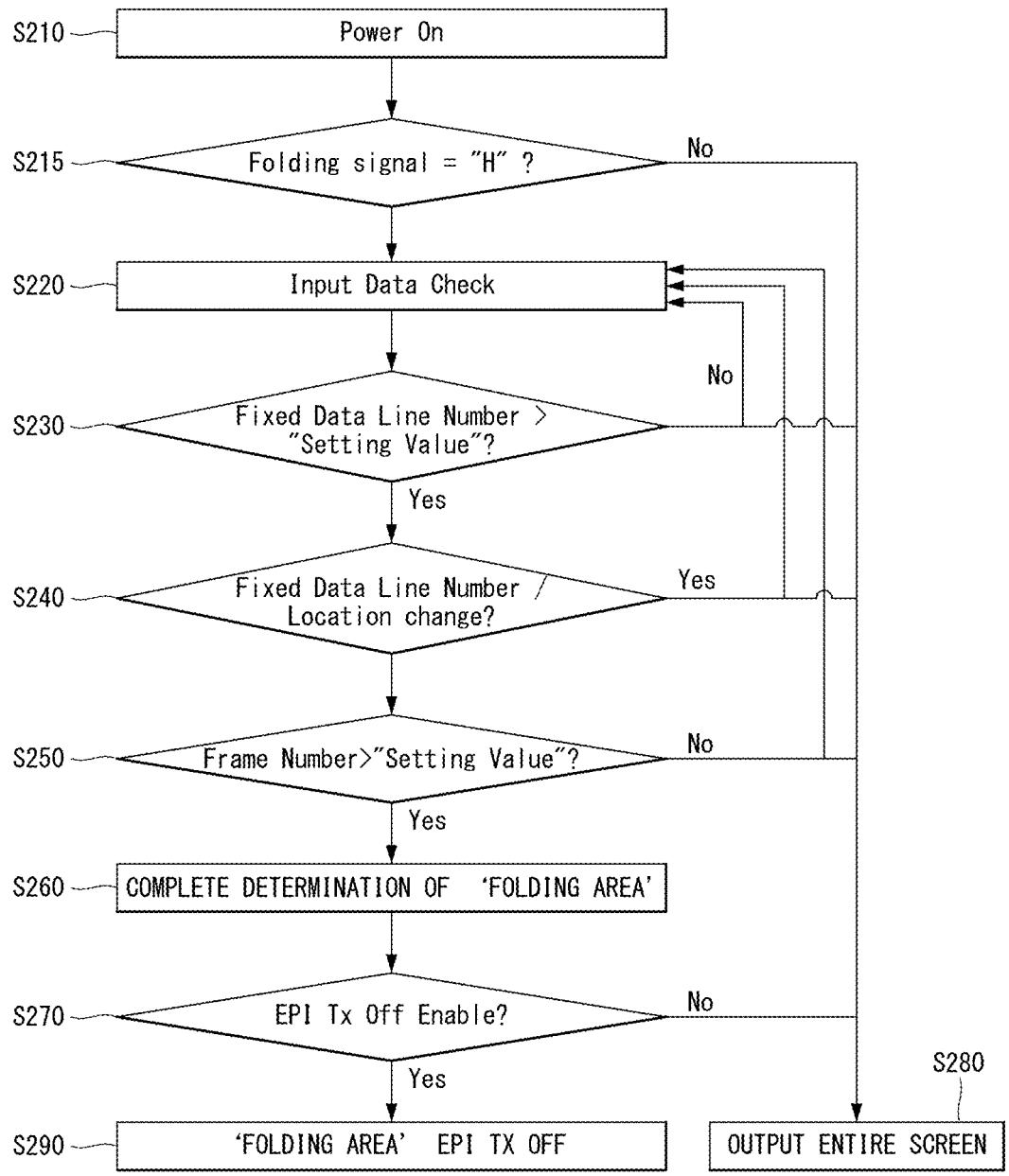
FIG. 17 is a flowchart illustrating a method of driving a display device according to the second aspect of the present disclosure.
Figure 18:
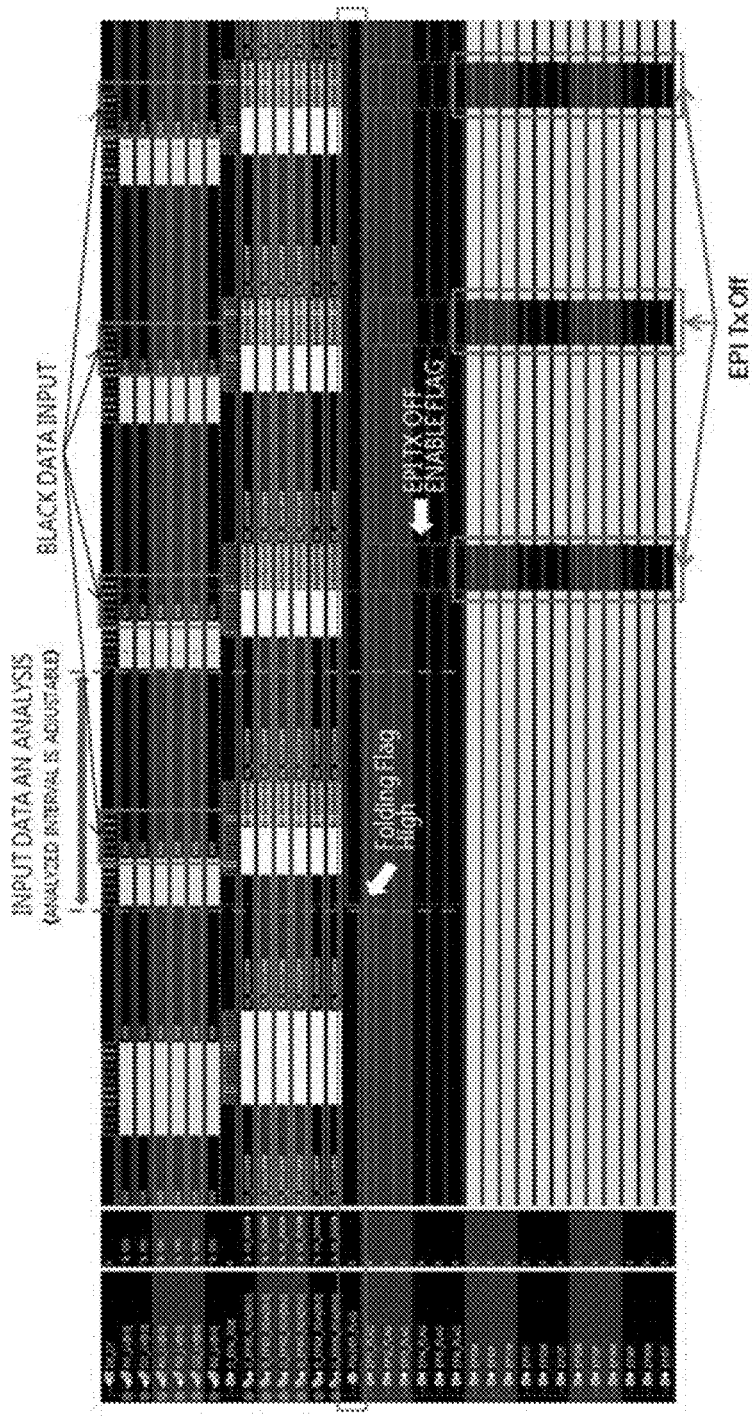
FIG. 18 is a reference waveform view illustrating a result of simulation performed on the basis of the second aspect of the present disclosure.

FIG. 14 illustrates an internal block of a timing controller according to a second aspect of the present disclosure, FIGS. 15 and 16 are views illustrating a change in output of a timing controller according to the second aspect of the present disclosure, FIG. 17 is a flowchart illustrating a method of driving a display device according to the second aspect of the present disclosure, FIG. 18 is a reference waveform view illustrating a result of simulation performed on the basis of the second aspect of the present disclosure.

As illustrated in FIGS. 14 to 16, the timing controller 120 includes the data analyzer 123, the data transmission controller 125, and the data transmitter 128.

The data analyzer 123 receives the data signal DATA and the control signal CS from the outside. The control signal CS includes a frame start signal FS (or a vertical synchronization signal Vsync), a data output signal DE, and a folding signal FF. The folding signal FF corresponds to a signal (a signal indicating folding of the display panel) that an external device (e.g., a folding sensor) detects and accordingly notifies when the display panel mechanically deformed such as being folded.

The data analyzer 123 analyzes the input data signal DATA only when the folding signal FF is input, and outputs a result value RLT for determining the presence or absence of a folded area on the display panel. The data analyzer 123 analyzes a data signal on a line-by-line and frame-by-frame basis and determines a location of the display area and the folded area on the basis of whether there is a fixed data signal.

The data analyzer 123 may analyze the data signal input in at least one line unit and one frame unit, and if there is a fixed data signal for I line and J frame, the data analyzer 123 may define the corresponding location as a folded area, but the present disclosure is not limited thereto. The data analyzer 123 may analyze whether a signal is outputable to the portion determined as the folded area.

The data transmission controller 125 outputs a transmission control signal EPITC for interrupting a signal output of the area corresponding to the folded area on the display panel on the basis of the result value RLT output from the data analyzer 123. Since the data transmission controller 125 recognizes that an image is not to be displayed on the folded area of the display panel on the basis of the result value RLT, the data transmission controller 125 generates the transmission control signal EPITC for preventing unnecessary signal output to the area (to prevent power consumption).

The data transmitter 128 sets a signal output interval for outputting the externally input data signal DATA and a period for not outputting a signal on the basis of the transmission control signal EPITC output from the data transmission controller 125.

The waveforms illustrated in FIGS. 15 and 16 are a data packet EPI and the control signals CS output from the timing controller 120. In the data packet EPI, and an effective data signal portion (Active Data) corresponds to data of the signal output interval to be applied to the first display area AA1 and a black data signal (Black Data) or an EPI transmission interruption (EPI Tx Off) portion corresponds to data of the signal output interruption interval.

The timing controller 120 may immediately write the signal output interruption interval when a logic high folding signal FF is input. However, in order to prevent a rapid change of an image due to the writing of the signal output interruption interval, the timing controller 120 may perform EPI transmission interruption (EPI Tx Off) after applying a black data signal (Black Data) as illustrated in FIG. 15 or may perform EPI transmission interruption (EPI Tx Off).

As described above, the data analyzer 123 according to the second aspect receives a separate folding signal FF indicating that the display panel is folded from the outside. As a result, unlike the first aspect, the data analyzer 123 does not always analyze the input data signal but analyze the input data signal only when the folding signal FF is input.

A method of driving a foldable display device according to the second aspect of the present disclosure will now be described with reference to FIGS. 14 to 17.

The power of the power source of the foldable display device is turned on (S210). It is determined whether the folding signal FF is input (Folding signal='H') (S215). For example, if the folding signal FF is applied in a logic high mode, it may be determined that the display panel is in a folded state (YES), and if the folding signal FF is applied in a logic low mode, it may be determined that the display panel is not folded (NO) (or vice versa).

If the folding signal FF is inputted, the input data signal is analyzed (Input Data Check) (S220). Determining whether the folding signal FF is input and analyzing the input data signal may be performed by the timing controller 120.

It is analyzed whether the number of fixed data lines (or fixed data signals) deviates from a first set value set in the timing controller 120 (S230). When the number of the fixed data lines does not deviate from the first set value (NO), it means that there is no folded area in the data signal being currently analyzed. In this case, the timing controller 120 outputs a data signal for full-screen output without the signal output interruption interval (S280). However, if the number of fixed data lines deviates from the first set value (YES), it means that there is a folded area in the data signal currently being analyzed. The first set value set in the timing controller 120 may be a fixed value or a change value that may be changed by an external input.

It is analyzed whether the number or location of the fixed data lines is changed (Fixed Data Line Number/Location change?) (S240). If the number or location of fixed data lines is changed (YES), it means that there is no folded area in the data signal currently being analyzed. In this case, the timing controller 120 outputs a data signal for full-screen output without the signal output interruption interval (S280). If, however, the number or location of the fixed data lines is not changed (NO), it means that there may be a folded area in the data signal currently being analyzed.

It is analyzed whether the number of frames deviates from a second set value set in the timing controller 120 (Frame Number>"Setting Value"?) (S250). If the number of frames does not deviate from the second set value (NO), it means that there is no folded area in the data signal being currently analyzed. In this case, the timing controller 120 outputs a data signal for full-screen output without the signal output interruption interval (S280). If, however, the number of frames deviates from the second set value (YES), it means that there is a folded area in the currently analyzed data signal (YES). The second set value set in the timing controller 120 may be a fixed value or a change value that may be changed by an external input.

If it is determined that the number of frames deviates from the second set value (YES), the timing controller 120 completes a final determination of the folded area ('Folded area' determination) (S260). In order to write the signal output interruption interval, it is determined whether EPI transmission interruption is enabled (EPI Tx Off Enable?) (S270). If the EPI transmission interruption is not enabled, the timing controller 120 outputs a data signal for full-screen output without the signal output interruption interval (S280). However, if the EPI transmission interruption is enabled, the timing controller 120 prepares a data packet to have the signal output interruption interval and performs EPI transmission interruption ('Folded area' EPI Tx Off) on the folded area (step S290).

As can be seen from the simulation result illustrated in FIG. 18, according to the second aspect of the present disclosure, the EPI transmission interruption (EPI Tx Off) may be performed on the basis of an EPI transmission interruption enable flag (EPI Tx Off Enable Flag). In addition, the interval for analyzing the input data signal may be adjusted. In addition, the EPI transmission interruption (EPI Tx Off) may be performed after the black data signal (Black Data) is input.

As described above, the second aspect of the present disclosure has the effect that a reduction in power consumption according to a reduction in data processing may be may be maximized because the input data signal is analyzed only when the folding signal is input and the data transmission interruption interval is prepared on the basis of a determination of the presence or absence of the folding area. In addition, the second aspect of the present disclosure has the effect that signal output of the timing controller may be accurately and precisely interrupted by interworking with the sensor for detecting folding of the foldable display panel.

Figure 20:
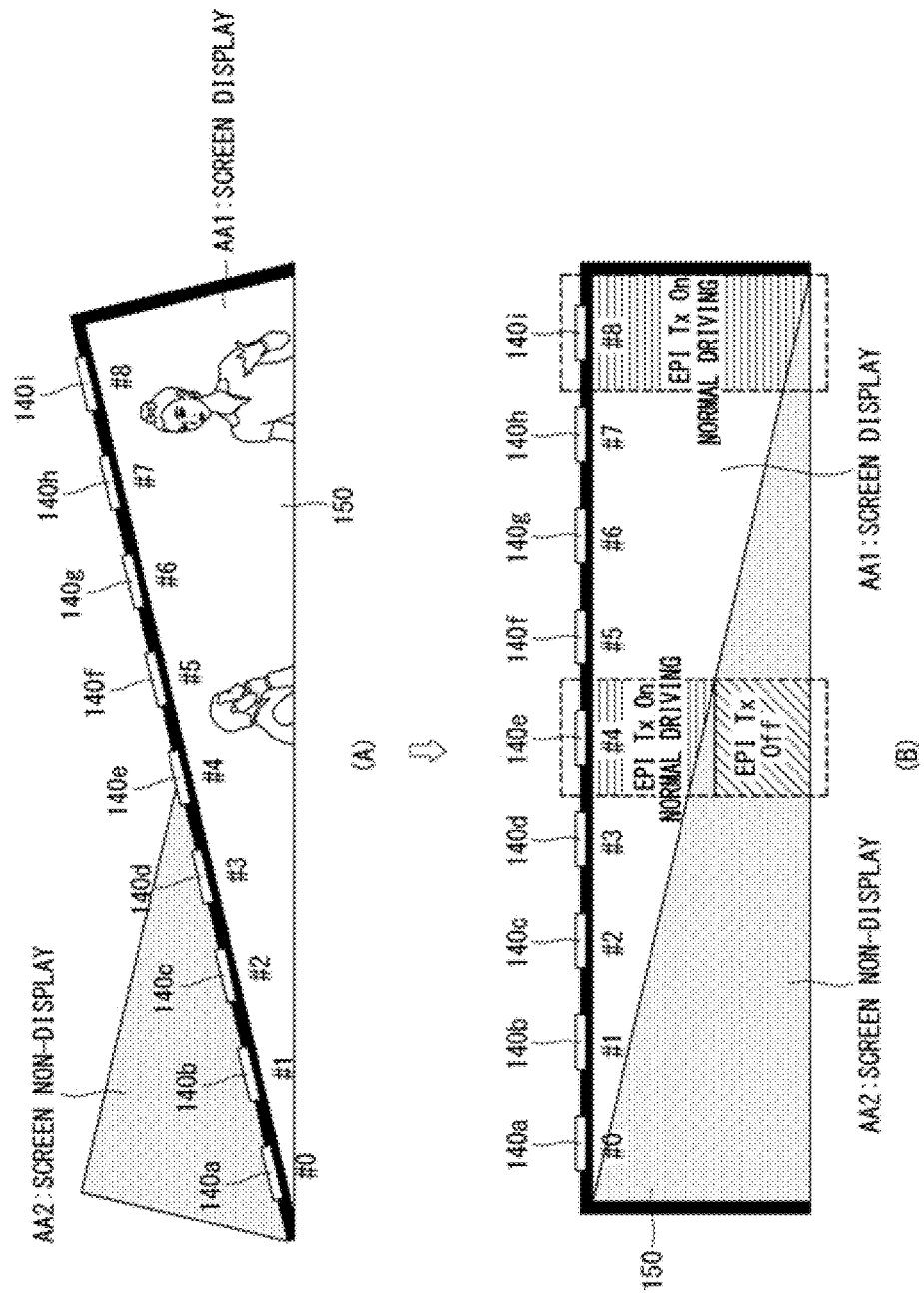
FIG. 20 is a view illustrating a change in output of a driver in accordance with a mechanical change of a foldable display panel according to the third aspect of the present disclosure.
Figure 21:
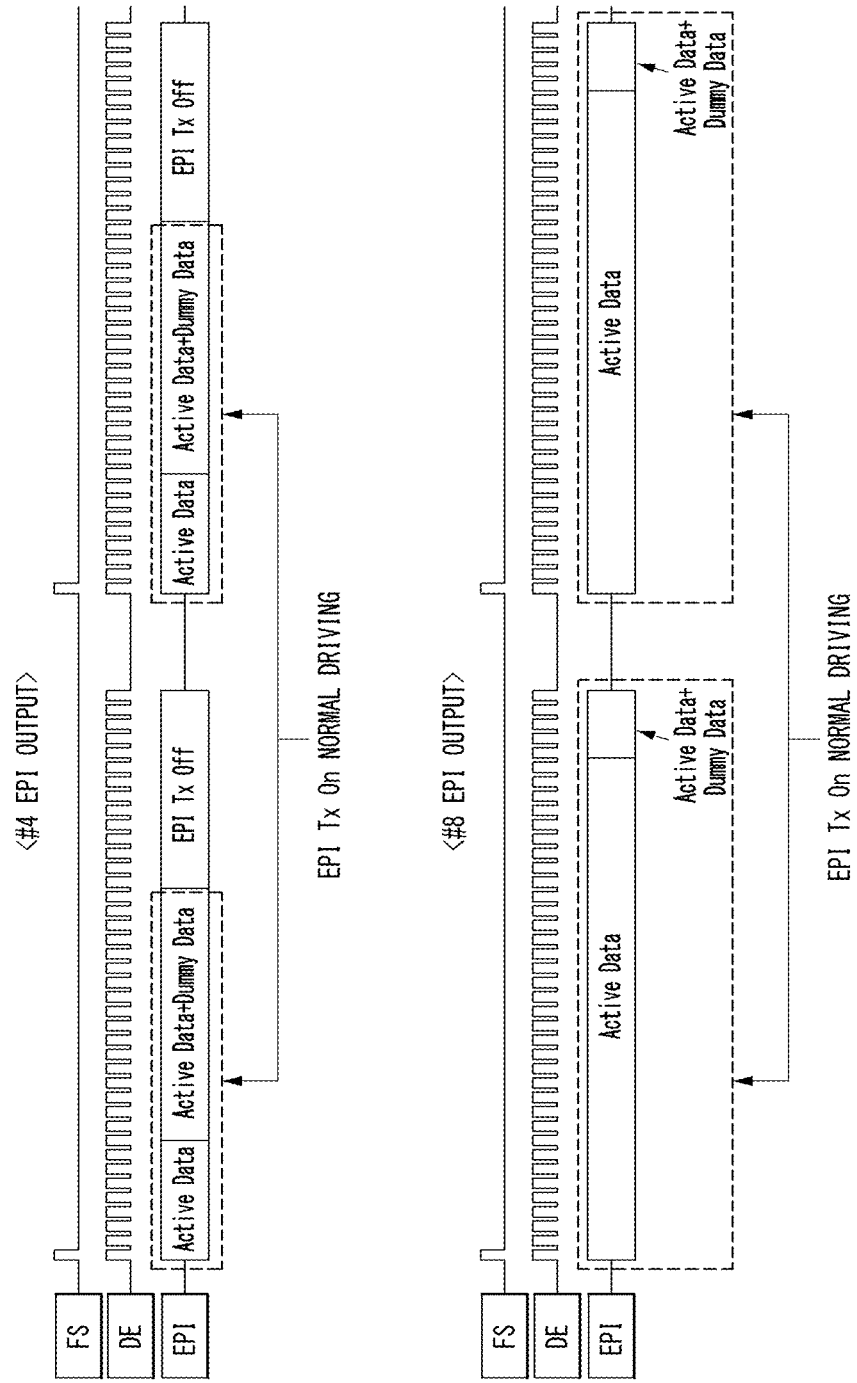
FIG. 21 is a view illustrating a change in output of a timing controller according to the third aspect of the present disclosure.
Figure 22:
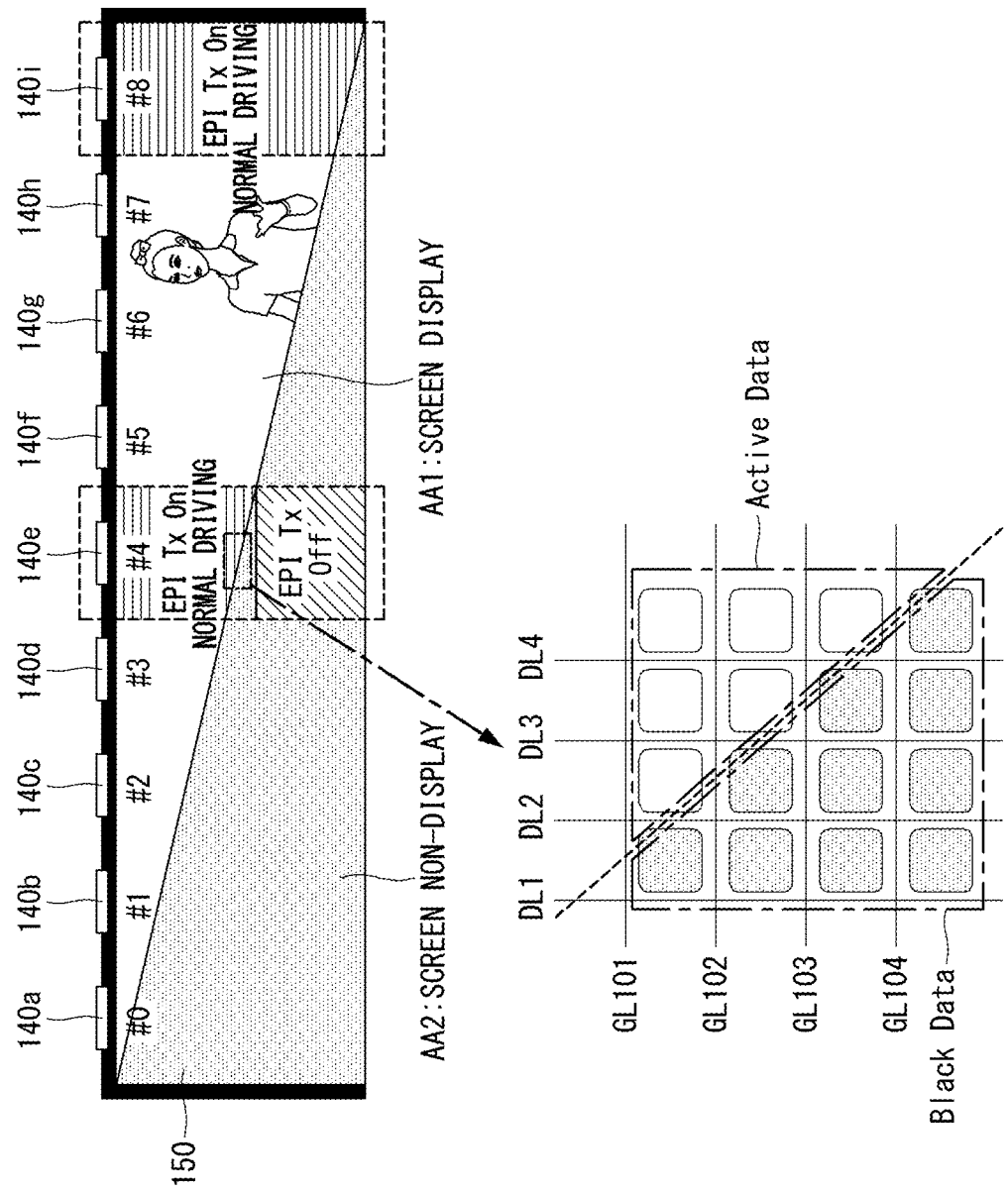
FIGS. 22 and 23 are views illustrating a change in output of data drivers according to the third aspect of the present disclosure.
Figure 23:
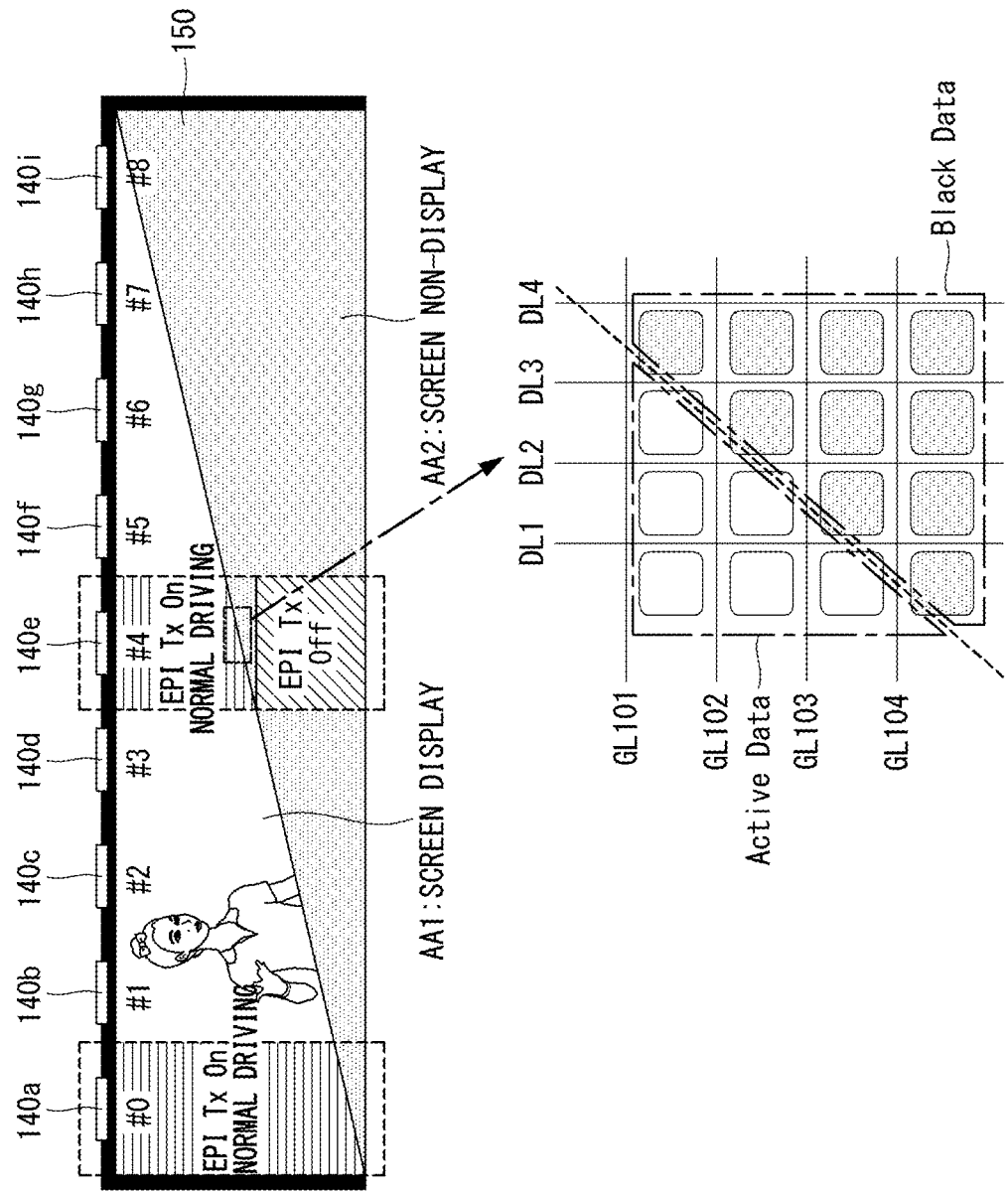

FIG. 19 is an exemplary view illustrating a folded foldable display panel according to a third aspect of the present disclosure, FIG. 20 is a view illustrating a change in output of a driver in accordance with a mechanical change of a foldable display panel according to the third aspect of the present disclosure, FIG. 21 is a view illustrating a change in output of a timing controller according to the third aspect of the present disclosure, and FIGS. 22 and 23 are views illustrating a change in output of data drivers according to the third aspect of the present disclosure.

As illustrated in FIG. 19, the foldable display panel 150 may be folded obliquely (or diagonally), folded in a V-shape (multi-folding), or rolled up. The foldable display panel according to the third aspect of the present disclosure may be implemented on the basis of the first aspect or the second aspect.

As illustrated in FIG. 19, when the foldable display panel 150 is folded in the diagonal line, the first display area AA1 is visible to the user but the second display area AA2 may be an area which is not visible to the user, that is, which is not viewed. In this case, it may be implemented such that the first display area AA1 may display an image on the screen but the second display area AA2 does not display an image on the screen. Here, power consumption may be reduced as much as not using the second display area AA2.

As illustrated in FIG. 20, the third aspect of the present disclosure is an example of a case where the foldable display panel 150 is folded in a diagonal line to include a portion having EPI transmission (EPI Tx On) and EPI transmission interruption (EPI Tx Off) and a portion having only EPI transmission interruption (EPI Tx Off).

As illustrated in FIGS. 9 and 19 to 22, the timing controller 120 outputs data signals on the basis of the data output signal DE for activating the start of outputting the data signals after the frame start signal FS indicating the start of the frame interval is generated as logic high. However, as illustrated in FIG. 20, a change in the output occurs on the transmission line of the timing controller 120 as the foldable display panel 150 is folded obliquely.

When viewed from the transmission line of the timing controller 120, a portion where the E-th data driver 140e of FIG. 20B is positioned is a fourth transmission port (#4 EPI) and a portion where an eighth data driver 140i is positioned is an eighth transmission port (#8 EPI).

First, the change in the output (#4 EPI output) of the fourth transmission port of the timing controller 120 will now be described as follows. The fourth transmission port (#4 EPI) of the timing controller 120 transmits a data signal to the E-th data driver 140e which is responsible for the center of the display panel 150.

As a folding tangent of the foldable display panel 150 is formed in the upper left and lower right, the fourth transmission port (#4 EPI) of the timing controller 120 outputs a data signal including a first interval having an effective data signal (Active Data), a second interval having the effective data signal and a dummy data signal (Active Data+Dummy Data), and a third interval having the EPI transmission interruption (EPI Tx Off).

When the folding tangents of the foldable display panel 150 is formed on the upper left and lower right, the fourth transmission port (#4 EPI) of the timing controller 120 has a line not including the effective data signal (Active Data) with respect to a vertical 1 line. The timing controller 120 determines that EPI transmission interruption (EPI Tx Off) may be enabled for a certain interval through an analysis of the input data signal, and outputs a data signal corresponding thereto.

Referring to FIG. 22, Table 1 below shows an example of a change in output of the E-th data driver 140e connected to the fourth transmission port of the timing controller 120 when the folding tangents of the foldable display panel 150 is formed on the upper left and lower right.

TABLE 1

|  | DL1 | DL2 | DL3 | DL4 |
| --- | --- | --- | --- | --- |
| GL101 | Black Data | Active Data | Active Data | Active Data |
| GL102 | Black Data | Black Data | Active Data | Active Data |

TABLE 1-continued

| | DL1 | DL2 | DL3 | DL4 |
|---|---|---|---|---|
| GL103 | Black Data | Black Data | Black Data | Active Data |
| GL104 | Black Data | Black Data | Black Data | Black Data |

In the case of respective outputs of the data lines of the E-th data driver 140e in the 101-th scan line GL101, the black data voltage (Black Data) is output to the first data line DL1 but the effective data voltage (Active Data) is output to the second to fourth data lines DL2 to DL4. In the case of respective outputs of the data lines of the E-th data driver 140e in the 102-th scan line GL102, the black data voltage (Black Data) is output to the first and second data lines (DL1 and DL2) but the effective data voltage (Active Data) is output to the third and fourth data lines DL3 and DL4. In the case of respective outputs of the data lines of the E-th data driver 140e in the 103-th scan line GL103, the black data voltage (Black Data) is output to the first to third data lines (DL1 to DL3) but the effective data voltage (Active Data) is output to the data line DL4. In the case of respective outputs of the data lines of the E-th data driver 140e in the 104-th scan line GL104, the black data voltage (Black Data) is output to the first to fourth data lines DL1 to DL4.

As can be seen from the example of FIG. 22, the E-th data driver 140e connected to the fourth transmission port of the timing controller 120 includes a portion receiving EPI transmission (EPI Tx On) and a portion having EPI transmission interruption (EPI Tx Off). However, if there is a folded area even in the portion receiving the EPI transmission (EPI Tx On), a buffer data voltage such as a black data voltage (Black Data) is applied to prevent a rapid change or abnormal display of an image.

The example of FIG. 23 is the opposite to that of FIG. 22, in which the folding tangents of the foldable display panel 150 is formed on the upper left and lower right. Table 2 below shows an example of a change in output of the E-th data driver 140e connected to the fourth transmission port of the timing controller 120.

TABLE 2

| | DL1 | DL2 | DL3 | DL4 |
|---|---|---|---|---|
| GL101 | Active Data | Active Data | Active Data | Black Data |
| GL102 | Active Data | Active Data | Black Data | Black Data |
| GL103 | Active Data | Black Data | Black Data | Black Data |
| GL104 | Black Data | Black Data | Black Data | Black Data |

Therefore, according to the present disclosure, it can be seen that, no matter in which type the folding tangent of the foldable display panel 150 is formed, the buffer data voltage such as the black data voltage (Black Data) may be applied to prevent a rapid change or abnormal display of an image in the portion receiving the EPI transmission (EPI Tx On) in consideration of the presence or absence of a folded area.

Next, a change in output (#8 EPI output) of the eighth transmission port of the timing controller 120 will be described. The eighth transmission port (#8 EPI) of the timing controller 120 transmits a data signal to the I-th data driver 140i, which is responsible for the outer portion of the foldable display panel 150.

Since the folding tangent of the foldable display panel 150 is formed in lower left and upper right, the eighth transmission port of the timing controller 120 includes a first interval having an effective data signal (Active Data) and a second interval having an effective data signal and a dummy data signal (Active Data+Dummy Data).

When the folding tangent of the display panel 150 is formed in lower left and upper right, the 8th transmission port (#8 EPI) of the timing controller 120 includes the effective data signals (Active Data) in every area with respect to a vertical 1 line, and thus, EPI transmission (EPI Tx On) is normally performed for the entire interval. The timing controller 120 determines that EPI transmission (EPI Tx On) is enabled for all the intervals through an analysis of the input data signal, and outputs a data signal corresponding thereto.

As can be seen from the example of the output of the fourth transmission port (#4 EPI output) and the output of the eighth transmission port (#8 EPI output), the interval in which the EPI transmission (EPI Tx On) is performed includes the effective data signal (Active Data) and the dummy data signal (Active Data+Dummy Data). The dummy data signal (Active Data+Dummy Data) may include a buffer data signal such as the black data signal (Black Data) or the like.

Meanwhile, the output of the fourth transmission port (#4 EPI output) shows that the first interval accounts for approximately 20%, the second interval accounts for approximately 50%, and the third interval accounts for approximately 30%, but this ratio depends on the ratio of the display area to the folded area. Therefore, it can be predicted that the outputs (#4 to #7 EPI outputs) of the first to seventh transmission ports of the timing controller 120 may vary depending on the ratio of the display area and the folded area.

Figure 24:
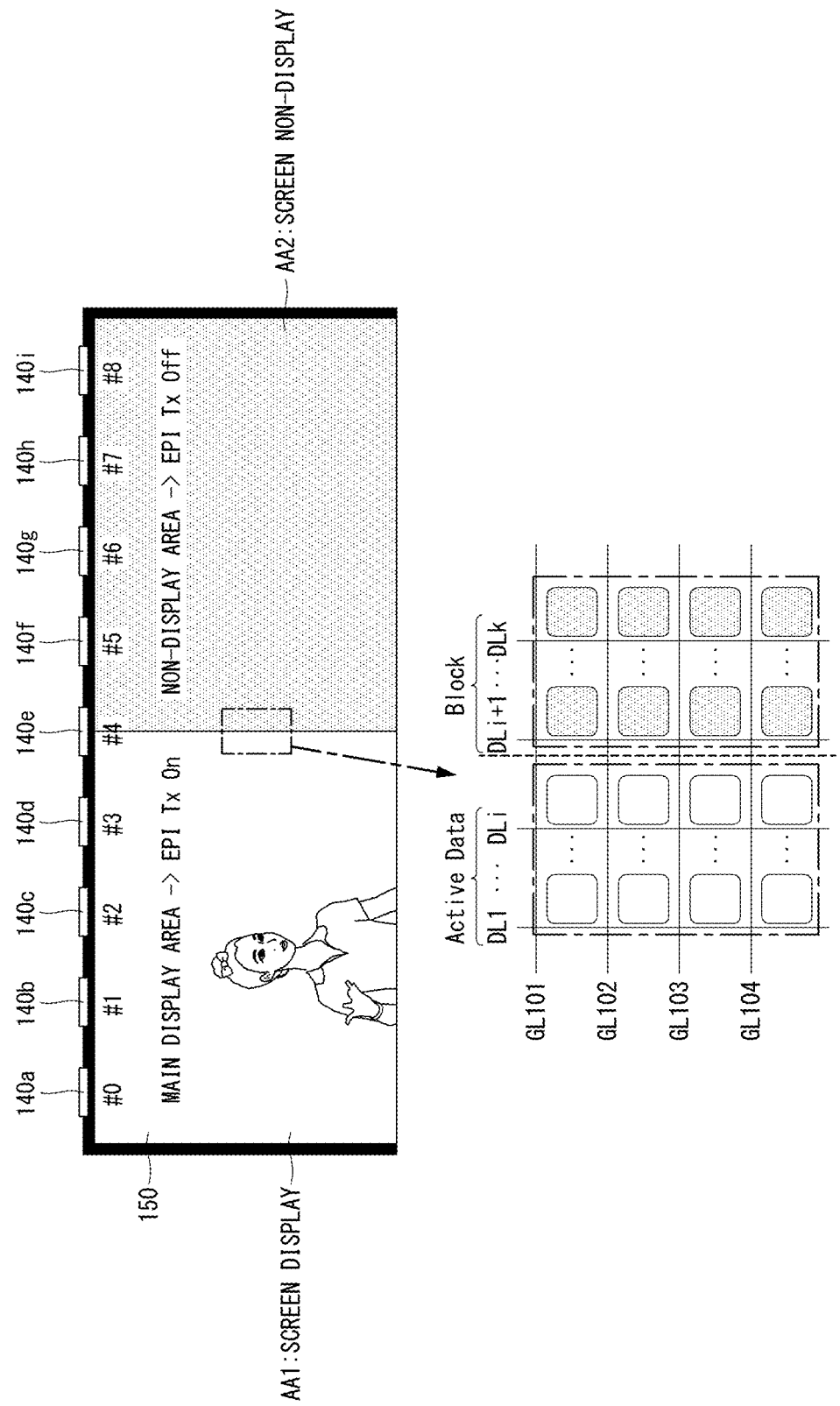
FIG. 24 illustrates an example in which a foldable display panel is folded and a change in output of the data drivers in accordance with the folded foldable display panel according to a fourth aspect of the present disclosure.

FIG. 24 illustrates an example in which a foldable display panel is folded and a change in output of the data drivers in accordance with the folded foldable display panel according to a fourth aspect of the present disclosure.

As illustrated in FIG. 24, when the foldable display panel 150 is folded in half in a longitudinal direction, the first display area AA1 may be visible to the user, while the second display area AA2 may be an invisible area that is not visible to the user. In this case, the first display area AA1 may display an image on the screen, but the second display area AA2 may not be displayed on the screen. Here, power consumption may be reduced by not using the second display area AA2.

The fourth aspect of the present disclosure is an example of a case where the foldable display panel 150 is folded in half in the longitudinal direction and includes a portion having only EPI transmission (EPI Tx On) and a portion having only EPI transmission interruption (EPI Tx Off).

As the folding tangent of the foldable display panel 150 is divided left and right in a longitudinal direction, first to third transmission ports (#1 to #3 EPI) of the timing controller 120 output a data signal in the form of including only a first interval having the effective data signal (Active Data) and fifth to eighth transmission ports (#5 to #8 EPI) of the timing controller 120 output a data signal in the form of including only a third interval having the EPI transmission interruption (EPI Tx Off). Meanwhile, a fourth transmission port #4 EPI of the timing controller 120 outputs a data signal in the form including the first interval having the effective data signal (Active Data) and the EPI transmission interruption (EPI Tx Off).

Table 3 below shows an example of a change in output of the E-th data driver 140e connected to the fourth transmission port of the timing controller 120 when the folding tangent of the display panel 150 is divided left and right in the longitudinal direction.

TABLE 3

|       | DL1         | DLi         | DLi + 1 | DLk   |
|-------|-------------|-------------|---------|-------|
| GL101 | Active Data | Active Data | Block   | Block |
| GL102 | Active Data | Active Data | Block   | Block |
| GL103 | Active Data | Active Data | Block   | Block |
| GL104 | Active Data | Active Data | Block   | Block |

In the 101-th scan line GL101 to the 104-th scan line GL104, the effective data voltage (Active Data) is output to the first to I-th data lines DL1 to DLi of the E-th data driver 140e. Meanwhile, in the 101-th scan line GL101 to the 104-th scan line GL104, a data voltage is not output to the (I+1)-th to K-th data lines DLi+1 to DLk of the E-th data driver 140e but interrupted (blocked).

Meanwhile, in the fourth aspect of the present disclosure, the case where the output channels of the E-th data driver 140e are halved to the channels outputting the data signal and the channels not outputting the data signal is taken as an example but this is merely an example and the ratio may be varied depending on a location of a folded area.

The third and fourth aspects of the present disclosure have the effect that since the signal output interval and the signal output interruption interval are varied according to the ratio of the display area and the folded area, it is possible to drive suitable for power saving although folding is performed in various shapes. In addition, according to the third and fourth aspects of the present disclosure, since the output channels of the data driver are divided into the output channel and the interruption channel according to the ratio of the display area and the folded area, power consumption may be reduced on the basis of output interruption of the timing controller and the data driver.

What is claimed is:

1. A foldable display device comprising:
   a foldable display panel configured to display an image, the foldable display panel having a first display area displaying a portion of the image on an entire of the first display area and a second display area, wherein the image is not displayed on the second display area the foldable display panel;
   a timing circuit including a data analyzer circuit, a data transmission control circuit, and a data transmitter circuit in a single integrated circuit (IC) package, wherein
      the data analyzer circuit is configured to receive a data signal and a control signal, analyze the data signal without using a sensor sensing a folding of the foldable display panel, and output a result value for determining presence or absence of a folded area corresponding to the second display area of the foldable display panel,
      the data transmission control circuit is configured to output a transmission control signal for blocking the data signal to be output to an area corresponding to the second display area of the foldable display panel based on the result value output from the data analyzer circuit, and
      the data transmitter circuit is configured to output the data signal to a data driver circuit based on the transmission control signal from the data transmission control circuit;
   the data driver circuit is configured to drive the foldable display panel based on the data signal; and
   an image supply device electrically connected to the timing circuit and configured to provide the data signal and the control signal to the data analyzer circuit of the timing circuit.

2. The foldable display device of claim 1, wherein the data analyzer circuit is configured to determine whether the foldable display panel is mechanically deformed.

3. The foldable display device of claim 1, wherein the data transmitter circuit is further configured to:
   rearrange the data signal according to an operation timing of the data driver circuit based on the data signal and a clock signal,
   convert the data signal into a differential signal pair data signal by adding the clock signal between the data signals, and
   transmit the differential signal pair data signal to the data driver circuit through an EPI interface, and
   wherein the data driver circuit includes a data receiver that includes a buffer receiving the differential signal pair data signal from the timing circuit, a restoring circuit restoring the clock signal, and a sampling circuit sampling the data signal by bits.

4. The foldable display device of claim 1, wherein the timing circuit always analyzes the data signal.

5. The foldable display device of claim 1, wherein the timing circuit varies a signal output interval for outputting the data signal and a signal output blocking interval for not outputting a signal according to a ratio of the first display area and the second display area.

6. The foldable display device of claim 1, wherein the timing circuit varies a first interval having a data signal to be supplied to the data driver circuit, a second interval having the data signal and a dummy data signal, and a third interval blocking transmission of the data signal to be supplied to the data driver circuit according to a ratio of the first display area displaying the image and the second display area not displaying the image on the foldable display panel when the foldable display panel is folded in a diagonal line.

7. The foldable display device of claim 6, wherein the data driver circuit includes at least one of a channel outputting a data voltage in response to the data signal, a channel outputting the data voltage and a dummy data voltage in response to the data signal and the dummy data signal, and a channel not outputting the data voltage and interrupted in response to transmission blocking of the data signal.

8. A method of driving a foldable display device, comprising:
   receiving a data signal and a control signal from at an image supply device of a foldable display panel for displaying an image;
   analyzing, by a timing circuit connected to the image supply device, the data signal without using a sensor sensing a folding of the foldable display device;
   outputting, by the timing circuit, a result value for determining presence or absence of a folded area corresponding to a second display area of the foldable display panel;
   outputting, by the timing circuit, a transmission control signal for blocking the data signal to be output to an area corresponding to the second display area of the foldable display panel based on the result value; and
   driving, by a data driver, the foldable display device based on the data signal.

9. The method of claim 8, wherein, the second display area is determined when a fold signal in the data signal is maintained for J frames, where J is an integer of 1 or greater.

10. The method of claim 8, wherein, a buffer data signal is written before transmission of the data signal to be supplied to the second display area is blocked.

11. The method of claim 10, wherein the buffer data signal includes a last data signal or black data signal output from the timing circuit included in the foldable display device.

12. The method of claim 8, wherein, in the blocking, a signal output interval for outputting the data signal and a signal output blocking interval for not outputting a signal are varied according to a ratio of a first display area and the second display area.

13. The method of claim 8, wherein the foldable display device includes at least one of a first area in which the data signal is displayed, a second area in which the data signal and a dummy data signal are displayed, and a third area in which transmission of the data signal is blocked.

14. The method of claim 8, wherein the analyzing the data signal includes determining if the foldable display device is mechanically deformed.

15. The foldable display device of claim 1, further comprising a scan driver having a first shift register disposed at a non-display area outside the first display area and outputting a scan signal to the first display area and a second shift register disposed at the non-display area outside the second display area,
wherein the first shift register is disposed to face the second shift register with reference to a fold signal.

16. The foldable display device of claim 1, wherein the data analyzer circuit is configured to:
analyze the data signal on a line-by-line and frame-by-frame basis and determine positions of the first display area and the folded area on the basis of whether there is a fixed data signal therein,
analyze whether a number of fixed data lines deviates from a first set value,
analyze whether the number or location of the fixed data lines is changed,
analyze whether a number of frames deviates from a second set value, and
output a result value for determining a location of the first display area and a location of the second display area based on the analyzed results.

17. The foldable display device of claim 16, wherein the data transmitter circuit is configured to:
set a signal output interval for outputting the data signal and a signal output blocking interval for not outputting the data signal on the basis of the transmission control signal,
output a first control signal to enable the first display area, and
output a second control signal to inhibit the second display area.

18. The foldable display device of claim 16, wherein the data transmitter circuit is configured to:
insert a last data or black data into the data signal in a portion of the data signal corresponding to the second display area; and
omit providing data in the portion of the data signal in a subsequent frame after a frame including the last data or black data.

19. The method of claim 8, wherein the analyzing the data signal further includes:
analyzing the data signal on a line-by-line and frame-by-frame basis and determine positions of a first display area and the folded area on the basis of whether there is a fixed data signal therein,
analyzing whether a number of fixed data lines deviates from a first set value,
analyzing whether the number or location of the fixed data lines is changed,
analyzing whether a number of frames deviates from a second set value, and
outputting a result value for determining a location of the first display area and a location of the second display area based on the analyzed results.

20. The method of claim 19, wherein the outputting the transmission control signal further including:
setting a signal output interval for outputting the data signal and a signal output blocking interval for not outputting the data signal on the basis of the transmission control signal,
outputting a first control signal to enable the first display area, and
outputting a second control signal to inhibit the second display area.

21. The method of claim 20, further comprising:
inserting a last data or black data into the data signal in a portion of the data signal corresponding to the second display area; and
omitting providing data in the portion of the data signal in a subsequent frame after a frame including the last data or black data.

* * * * *